United States Patent
Vessels et al.

(10) Patent No.: US 11,822,648 B2
(45) Date of Patent: Nov. 21, 2023

(54) SYSTEMS AND METHODS FOR REMOTE ANOMALY DATA SCANNER FOR CYBER-PHYSICAL SYSTEMS

(71) Applicant: Honeywell International Inc., Charlotte, NC (US)

(72) Inventors: Ly Vessels, Chandler, AZ (US); Asongu Tambo, Easgan, NM (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 238 days.

(21) Appl. No.: 17/238,478

(22) Filed: Apr. 23, 2021

(65) Prior Publication Data

US 2021/0334365 A1   Oct. 28, 2021

Related U.S. Application Data

(60) Provisional application No. 63/014,791, filed on Apr. 24, 2020.

(51) Int. Cl.
  *G06F 21/55* (2013.01)
  *H04L 9/08* (2006.01)
  *H04L 9/40* (2022.01)

(52) U.S. Cl.
  CPC .......... *G06F 21/552* (2013.01); *H04L 9/0825* (2013.01); *H04L 9/0897* (2013.01); *H04L 63/0428* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 9,727,737 B1* | 8/2017 | Hitchcock | G06F 3/04883 |
| 10,865,633 B2* | 12/2020 | Coste | E21B 47/26 |
| 2021/0152353 A1* | 5/2021 | Canillas | H04L 9/3073 |

OTHER PUBLICATIONS

Extended European Search Report dated Sep. 21, 2021 in European Application No. 21170021.6 (8 pages).
Andre Rein et al., "Trust Establishment in Cooperating Cyber-Physical Systems", Jun. 18, 2816 (2816-86-18), ICIAP: International Conference on Image Analysis and Processing, 17th International Conference, Naples, Italy, Sep. 9-13, 2813. Proceedings; [Lecture Notes in Computer Science; Lect. Notes Computer], Springer, Berlin, Heidelberg, pp. 31-47, XP847347471.
Yeluri Raghu et al., "Attestation: Proving Trustability", Mar. 27, 2014, pp. 65-91, XP055763916, [https://link.springer.com/content/pdf/10.1007/978-1-4302-6146-9_4.pdf].

* cited by examiner

*Primary Examiner* — Bradley W Holder
(74) *Attorney, Agent, or Firm* — Lorenz & Kopf LLP

(57) ABSTRACT

Disclosed are methods, systems, and non-transitory computer-readable medium for detecting data anomalies on a device. For instance, the method may include: receiving an initial data measurement transmitted by the device, wherein the initial data measurement includes a measurement of data stored in the device using a unique key associated with the device; transmitting a request for a subsequent data measurement of data stored in the device; receiving the subsequent data measurement transmitted by the device; comparing the subsequent data measurement to the initial data measurement; and determining whether an anomaly exists in the data stored in the device based on the comparison.

18 Claims, 16 Drawing Sheets

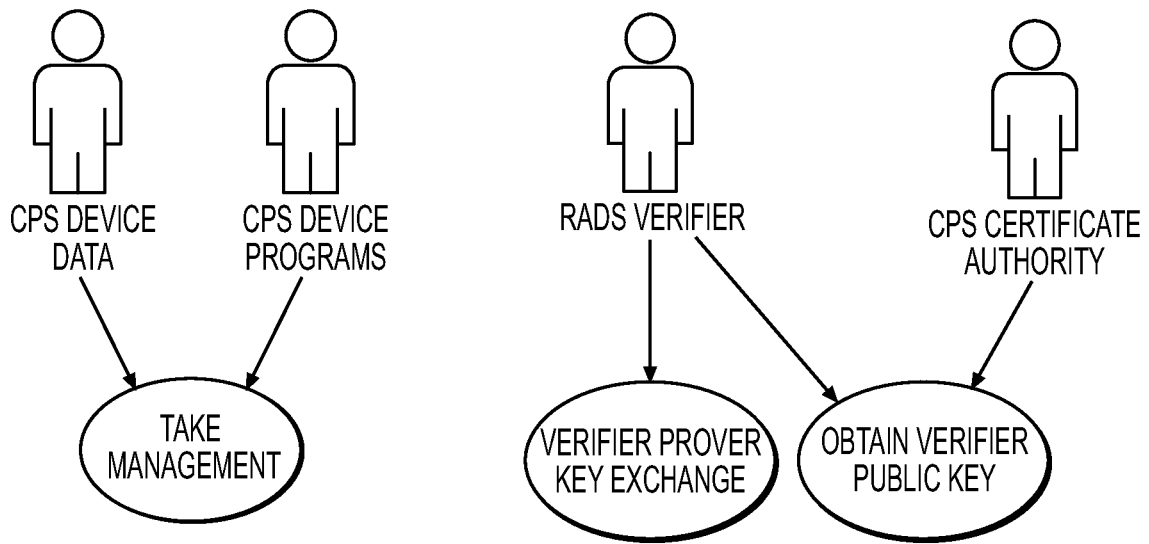
FIG. 12D
FIG. 12E
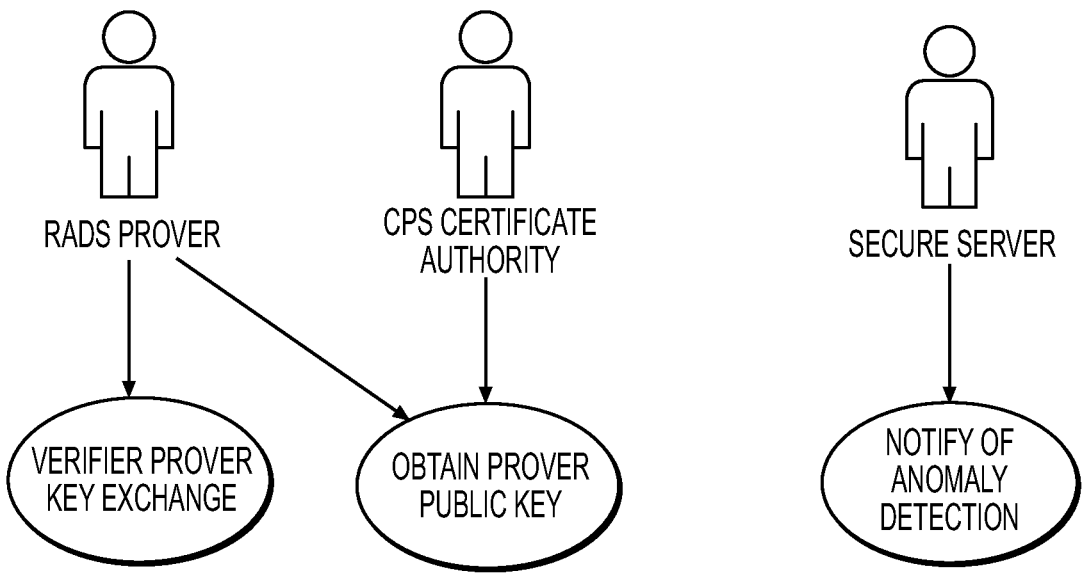
FIG. 12F
FIG. 12G

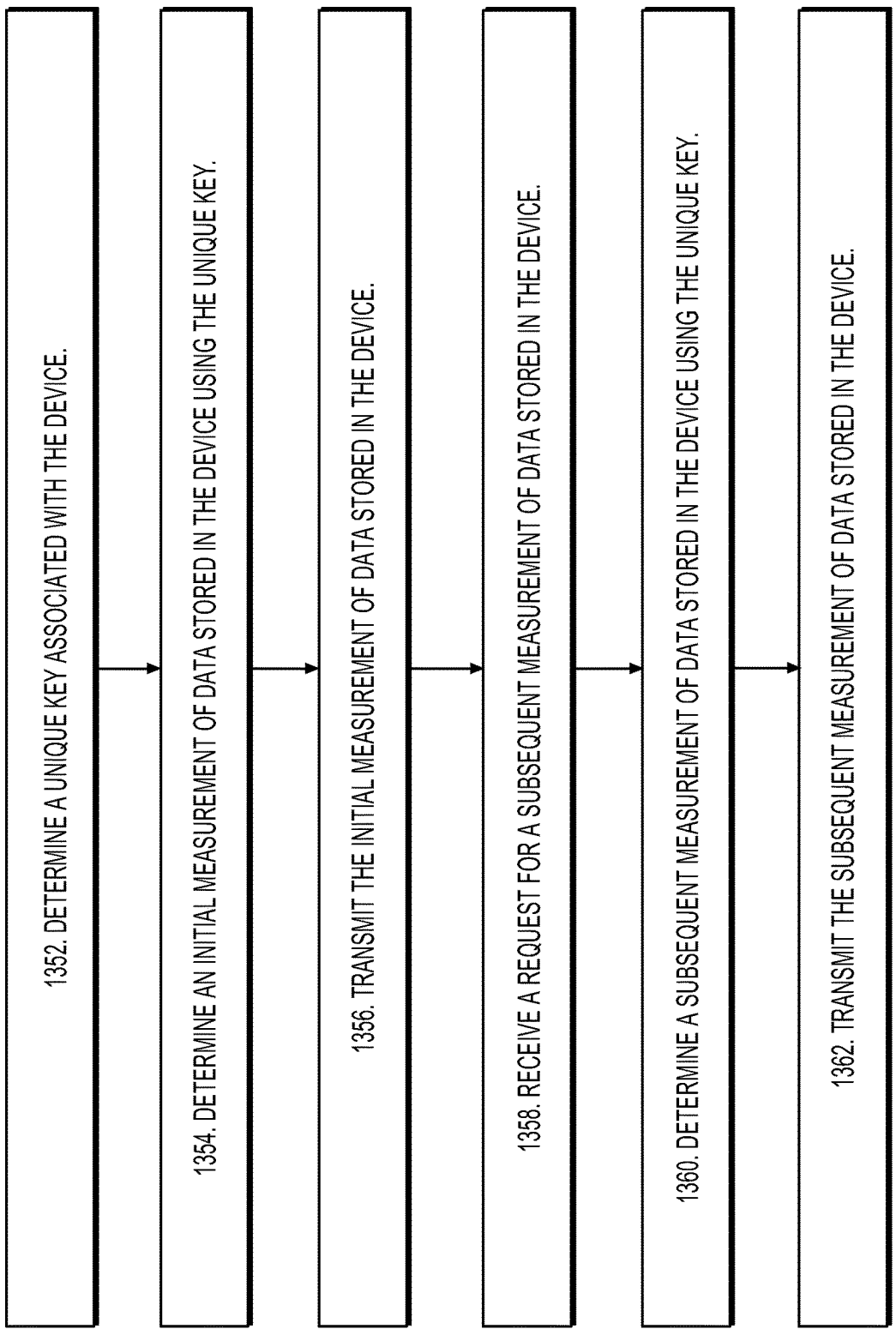

SYSTEMS AND METHODS FOR REMOTE ANOMALY DATA SCANNER FOR CYBER-PHYSICAL SYSTEMS

RELATED APPLICATIONS

This application claims the benefit of priority to U.S. Provisional Application No. 63/014,791 filed Apr. 24, 2020, the entirety of which is hereby incorporated herein by reference.

TECHNICAL FIELD

Various embodiments of the present disclosure generally relate to security capabilities of cyber-physical systems (CPS), such as control systems on vehicles, ships, aircrafts, and industrial plants, etc.

BACKGROUND

Cyber-physical systems (CPS) assume that the software systems operating the physical aspects of a system are safe, but many of these systems were developed before the concept of cyber-crime. Accordingly, there is a need for improved security capabilities for CPS devices.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods related to security capabilities of cyber-physical systems (CPS), such as control systems on vehicles, ships, aircrafts, and industrial plants, etc., are disclosed.

In one embodiment, a computer-implemented method is disclosed for detecting data anomalies on a device. The method may include receiving, by one or more processors, an initial data measurement transmitted by the device, wherein the initial data measurement includes a measurement of data stored in the device using a unique key associated with the device; transmitting, by the one or more processors, a request for a subsequent data measurement of data stored in the device; receiving, by the one or more processors, the subsequent data measurement transmitted by the device; comparing, by the one or more processors, the subsequent data measurement to the initial data measurement; and determining, by the one or more processors, whether an anomaly exists in the data stored in the device based on the comparison.

In one embodiment, a computer-implemented method is disclosed for detecting data anomalies on a device. The method may include determining, by one or more processors, a unique key associated with the device; determining, by the one or more processors, an initial measurement of data stored in the device using the unique key; transmitting, by the one or more processors, the initial measurement of data stored in the device; receiving, by the one or more processors, a request for a subsequent measurement of data stored in the device; determining, by the one or more processors, a subsequent measurement of data stored in the device using the unique key; and transmitting, by the one or more processor, the subsequent measurement of data stored in the device.

In one embodiment, a non-transitory computer-readable medium storing instructions that, when executed by a processor, cause the processor to perform a method for detecting data anomalies on a device is disclosed. The method may include receiving an initial data measurement transmitted by the device, wherein the initial data measurement includes a measurement of data stored in the device using a unique key associated with the device; transmitting a request for a subsequent data measurement of data stored in the device; receiving the subsequent data measurement transmitted by the device; comparing the subsequent data measurement to the initial data measurement; and determining whether an anomaly exists in the data stored in the device based on the comparison.

In one embodiment, a computer-implemented method is disclosed for detecting data anomalies on a device. The method may include communicating, by a prover on the device, with a verifier on a server to exchange a public key; communicating, by the verifier, with a certificate authority to obtain one or more public key and private key pairs; storing, by the verifier, an initial data measurement from the prover; determining, by the verifier, a configuration of one or more scan clusters and frequencies; negotiating, by the verifier, with the prover to determine the public key for the prover; processing, by the verifier, a check of the device including the prover based on the one or more scan clusters, wherein process the public key and private key pair, thereby enabling authentication of encrypted communication between the verifier and the device; transmitting, by the verifier, a query to the prover; receiving, by the verifier, subsequent data measurements from the prover; comparing, by the verifier, the subsequent data measurements with the initial data measurement; and determining, by the verifier, an anomaly based on the comparison.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 12A-12G depict examples of use cases of the RADS according to some embodiments.

FIGS. 13A-13B depict flowcharts of methods of detecting data anomalies on a device according to some embodiments.

DETAILED DESCRIPTION

Figure 1:
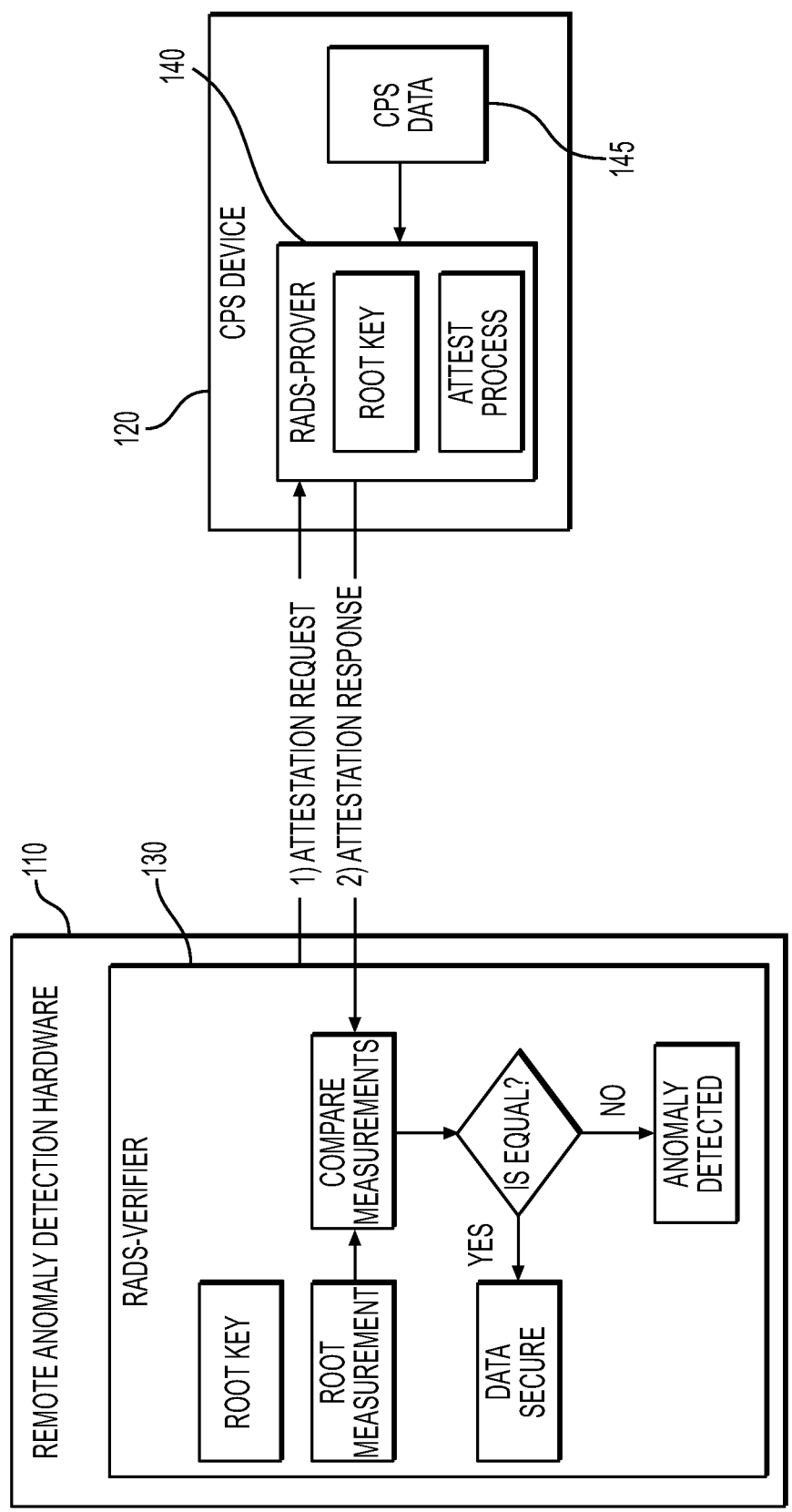
FIG. 1 depicts an exemplary state diagram of interaction between a RADS Verifier and Prover according to some embodiments.

The following embodiments describe methods and systems for security capabilities of cyber-physical systems (CPS), such as control systems on vehicles, ships, aircrafts, and industrial plants, etc.

While there is considerable effort to improve the security of cyber-physical systems, less focus exists on weaving security into the software of cyber-physical systems. The result of this lack of focus is the need for expensive perimeter protection solutions. A conventional security solution, such as a virus/malware scanning software, is sometimes employed to detect the presence of malicious software on a computing platform. Such conventional security solutions require advanced hardware and software (e.g., operating system, file system, at least 500 MB of RAM, etc.) configurations that are not typically found in a CPS device (e.g., no operating system, no file system, approximately 50 KB of RAM, etc.). As such, there is a need to determine authenticity of software and/or firmware for CPS devices that do not have the hardware and/or software support to host such conventional security solutions.

As will be described in further detail below, embodiments disclosed herein allow ascertaining the authenticity of software and/or firmware installed on a CPS device without relying on extensive hardware configurations. Additionally, the embodiments disclosed herein may meet military security standards. The embodiments disclosed herein may function across a network to ascertain the authenticity of data on all devices across an enterprise.

As will be described in further detail, the embodiments disclosed herein provide: (1) a file scanning solution for embedded devices that uses remote attestation with a combination of hardware and software security measures, (2) a file scanning solution to remotely verify the authenticity of software/firmware stored on a remote device, (3) hardware security keys and asymmetric keys that may be utilized for encrypting/decrypting communication between the a verifier engine and a prover engine, and (4) an algorithm for obtaining a measurement of data stored on the CPS device.

As will be described in further detail below, the embodiments disclosed below provide a layer of cyber security to a cyber-physical system that complements other layers of cyber-security in development. For example, an embedded device may be monitored for changes in software/firmware that may be indicative of a cyber-attack. Most conventional layers of cyber-security are layers of defense to prevent attackers from breaking into the system. The embodiments disclosed herein may be utilized when an attacker has somehow broken through the other preliminary lines of defense, for example, directed to preventing the attacker from breaking into the system.

Some technical benefits provided by the embodiments disclosed herein may include, but are not limited to, the following: (1) a certifiable and accreditable technical security method for remotely detecting anomalies in software/firmware installed on a cyber-physical device, (2) some embodiments may fit in a small form-factor (e.g., a small form factor with no operating system and/or file system), (3) the embodiments may be distributed and utilized to monitor a cluster of CPS devices at the same time, (4) the embodiments may be optimized to execute in seconds versus hours/days for conventional file scanning solutions, and (5) the embodiments may utilize negligible network bandwidth for communication purposes. The embodiments disclosed herein provide cybersecurity monitoring for CPS devices, as will be described in further detail below.

In some embodiments, there is provided a Remote Anomaly Data Scanner (RADS). The RADS may detect security anomalies inside Cyber-Physical Systems (CPS). The RADS may enable simultaneous detection of security anomalies for a cluster of CPS distributed through a CPS platform. The RADS may utilize a security method referred to herein as a remote attestation security method and utilize this method to detect security anomalies existing in cyber-physical systems with restricted resources. That is, the RADS may enable the detection of security anomalies for devices that have restricted resources and thereby unable to execute a conventional full file scan (e.g. virus scan). As will be described in further detail below, the remote attestation security method allows a trusted device (e.g. server) to remotely authenticate the contents of a separate device (e.g. an embedded device). Using this method, the remote attestation security method, the RADS may monitor firmware and configuration files stored on a remote CPS device for malicious activity.

In some embodiments, the RADS may be an apparatus that uses a combination of hardware and software to realize its capabilities. RADS may depend on the hardware to provide root-of-trust for software subsystems (e.g., RADS Verifier and RADS Prover as will be described in further detail below). The RADS software may utilize original CPS device measurements stored in the RADS Hardware to validate the integrity of the CPS devices.

FIG. 1 depicts an exemplary state diagram of interaction between a RADS verifier 130 and a RADS prover 140 according to some embodiments. In the context of the current disclosure, a RADS system (or simply RADS) may refer to the system including the RADS verifier 130 and the RADS prover 140. As shown in FIG. 1, a CPS device 120 may include the RADS prover 140 and remote anomaly detection hardware 110 (also referred to as RADS hardware) may include the RADS verifier 130.

The CPS device 120 may be manufactured, for example, by a CPS supplier. In some embodiments, a cryptographic module may be used to create a unique key (hereinafter referred to as a "root key") for the CPS device 120 during the manufacturing process. As shown in FIG. 1, the root key may be installed on a trusted platform module of the CPS device 120. In some embodiments, the root key may be installed on a trusted platform module (TPM) of the CPS device 120. In some embodiments the TPM may be a part of an interconnected cybersecurity system (hereinafter referred to as "HC2") hardware of the CPS device 120.

The RADS prover 140 may be installed on the CPS device 120. In some embodiments, the RADS prover 140 may be installed on the HC2 hardware of the CPS device 120. In some embodiments, the root key may be utilized to make an initial measurement, e.g., also referred to as a root measurement, of the CPS data 145 on the CPS device 120. The root measurement may be transferred to the RADS Verifier 130.

The RADS verifier 130 may be installed on the remote anomaly detection hardware 110. In some embodiments, the remote anomaly detection hardware 110 may be, or a part of, a security service server, for example, a CPS enterprise security service general-purpose platform. The RADS verifier 130 may install the root measurement received from the RADS prover 140 in the remote anomaly detection hardware 110. In some embodiments, the RADS verifier 130 may install the root measurement from the RADS prover 140 in the TPM of the remote anomaly detection hardware 110.

The RADS prover 140 and the RADS verifier 130 may interact as described below with reference to FIG. 1, according to some embodiments.

The RADS prover 140 may start up when the CPS device 120 starts up. Once started up, the RADS prover 140 may communicate with the RADS verifier 130 to exchange public keys.

The RADS verifier 130 may start up and communicate with a CPS certificate authority to obtain one or more public and private key pairs. As described above, the RADS verifier 130 may store the root measurement received from the RADS prover 140 in the TPM of the remote anomaly detection hardware 110. In some embodiments, the RADS verifier 130 may be configured for specific scan clusters and frequencies. The RADS verifier 130 and one or more connected RADS provers 140 may communicate to obtain each respective public key. The RADS verifier 130 may initiate a check of the one or more CPS devices specified by the configured scan cluster. In some embodiments, during the check, the RADS verifier 130 may negotiate for public/private keys with the one or more CPS devices to authenticate encrypted communications between the RADS verifier 130 and the one or more CPS devices.

As shown in FIG. 1, during execution in accordance to the configured scan cluster, the RADS verifier 130 may send a query to the RADS prover 140 (depicted as "attestation request" in FIG. 1). In response to the attestation request, the RADS prover 140 may take measurements of the CPS data 145 using the root key and return a response (depicted as "attestation response" in FIG. 1) including the measurements to the RADS verifier 130.

The RADS verifier 130 may compare the received measurement with the stored root measurement. The RADS verifier 130 may determine any deviations from the desired response, thereby determining that data stored on the CPS device 120 is not in the expected state, hence determining an anomaly. For example, the RADS verifier 130 may determine whether the received measurement and the stored measurement are equal. As a result of determining that the received measurement and the stored measurement are equal, the RADS verifier 130 may determine that the CPS data 145 is secure. As a result of determining that the received measurement and the stored measurement are not equal, the RADS verifier 130 may determine that there is an anomaly.

As described above, the RADS system may be used as a substitute for conventional file scanning. Given that embedded systems/devices, e.g., CPS device 120, have limited hardware, conventional file scanning solutions cannot be deployed on such devices because conventional file scanning solutions require advanced hardware capabilities. Accordingly, the RADS system may utilize remote attestation to check the authenticity of firmware/binaries stored on an embedded device, e.g., CPS device 120. The significant improvements provided by the RADS system compared to conventional systems are listed, but not limited to, in the following: (1) establishment of secure communications between the RADS subsystems (e.g., RADS verifier 130 and RADS prover 140, using public/private and root keys, where the public/private keys may be negotiated between the RADS verifier 130 and RADS prover 140 each time the RADS verifier 130 starts up); and (2) the algorithm (e.g., based on remote attestation as described herein) by which the RADS prover 140 takes measurements on the data 145 stored on the CPS device 120.

An exemplary system architecture for the RADS is described below. For example, context, system, hardware, software, data, security, interface, dynamic behavior, and deployment of the RADS is described in further detail below. It is understood that the RADS is not restricted to the system architecture described below provided below and that there may be variations to the system architecture in alternative embodiments.

Figure 2:
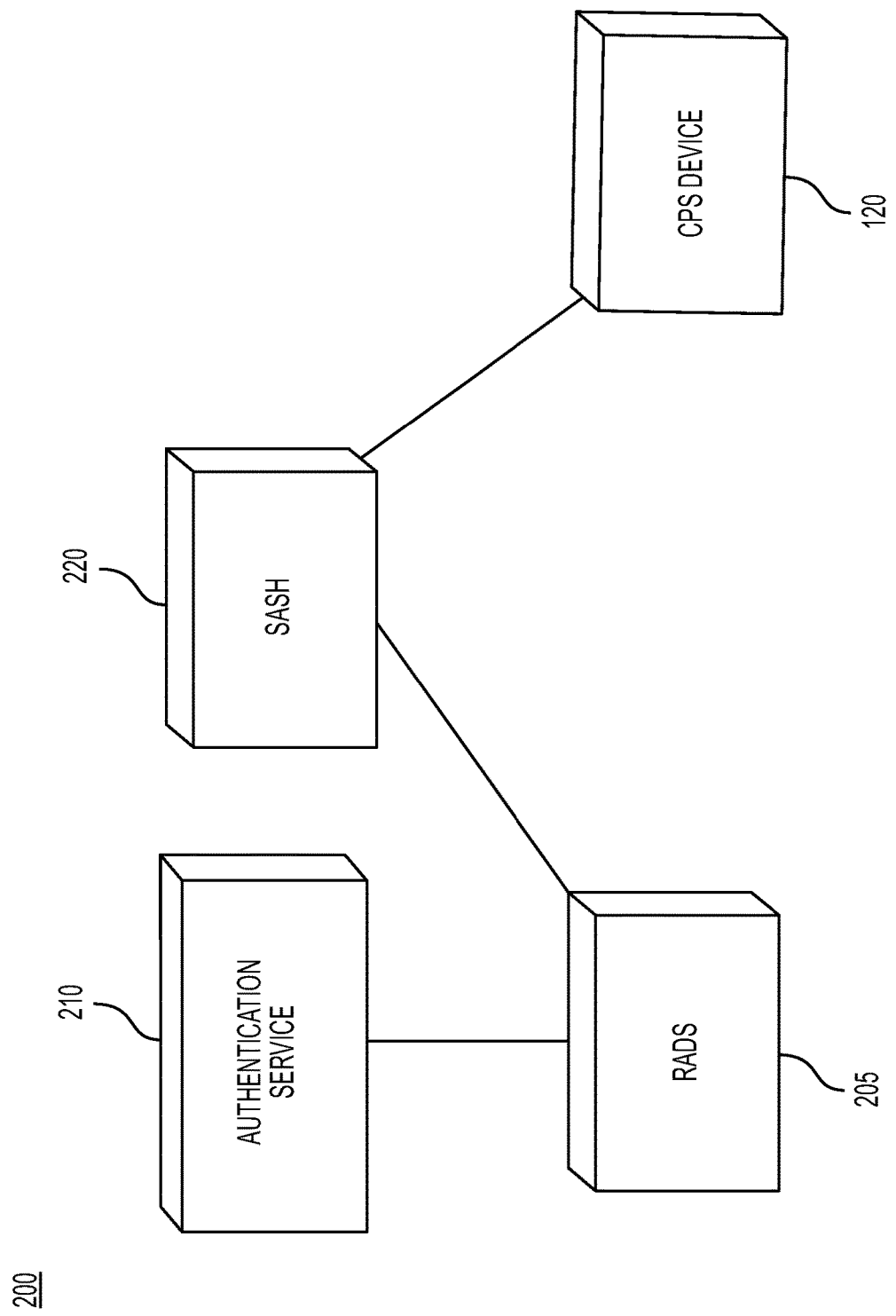
FIG. 2 depicts an example environment in which methods, systems, and other aspects of the present disclosure may be implemented according to some embodiments.

FIG. 2 depicts an example environment 200 in which methods, systems, and other aspects of the present disclosure may be implemented according to some embodiments. Remote Anomaly Data Scanner (RADS) 205 is a system that may be used to detect anomalies in the data on Cyber-Physical System (CPS) device 120. In some embodiments, the RADS 205 may be a collection of hardware and software components.

As shown in FIG. 2, RADS 205 may connect to the CPS device 120 via a secure access server 220, e.g., a Secure Access Smart Hub (SASH). RADS 205 may determine the integrity of data on the CPS device 120 via the connection. In some embodiments, the RADS 205 may: (i) monitor program files on a remote device (e.g., CPS device 120) for anomalies, (ii) monitor configuration files and/or data on the remote device for anomalies, and/or (iii) save relevant information to a log (e.g. time of scanning request event, duration of scanning). In some embodiments, an authentication service 210 may be configured to authenticate the RADS 205.

As noted above, RADS 205 may be a collection of software and hardware components configured to remotely determine the integrity of data stored on the Cyber-Physical System (CPS) device 120. This integrity check may be performed remotely because the CPS device 120 does not have sufficient hardware to host traditional file scanning software. As such, one benefit of the embodiments disclosed herein is the use of remote attestation to perform integrity checks on remote systems, e.g., CPS device 120.

In some embodiments, the RADS 205 has two main components: a RADS verifier 130 and a RADS prover 140. The RADS verifier 130 and the RADS prover 140 may each have hardware and software components. In some embodiments, the RADS verifier 130 software may be hosted on the Remote Anomaly Data Scanner Hardware 110. In some embodiments, RADS prover 140 software may be hosted on the CPS device 120. For example, the RADS prover 140 software may be hosted on HC2 hardware on the CPS device 120 and communicate with the CPS device 120 controller. In some embodiments, the RADS verifier 130 may communicate with the RADS prover 140 via the Secure Access Smart Hub (SASH) 220.

During operation, the RADS verifier 130 may send a query to the RADS prover 140. Upon receipt of this query, the RADS prover 140 may perform computations on the data stored on the CPS device 120 and returns the result, e.g., root measurements, to the RADS verifier 130. The RADS verifier 130 may use this response to determine the integrity of the data on the CPS device 120. This approach provides a technical advantage compared to convention systems as it combines the following aspects of hardware and software solutions: (i) the establishment of secure communications between the RADS subsystems using public/private and root keys (e.g., public/private keys may be negotiated between the two systems each time the RADS verifier 130 starts up), and (ii) the algorithm (e.g., based on remote attestation as described herein) by which the RADS Prover takes measurements on the data stored on the CPS device.

The components and subsystems of the RADS 205 are explained in further detail below with reference to FIG. 3.

Figure 3:
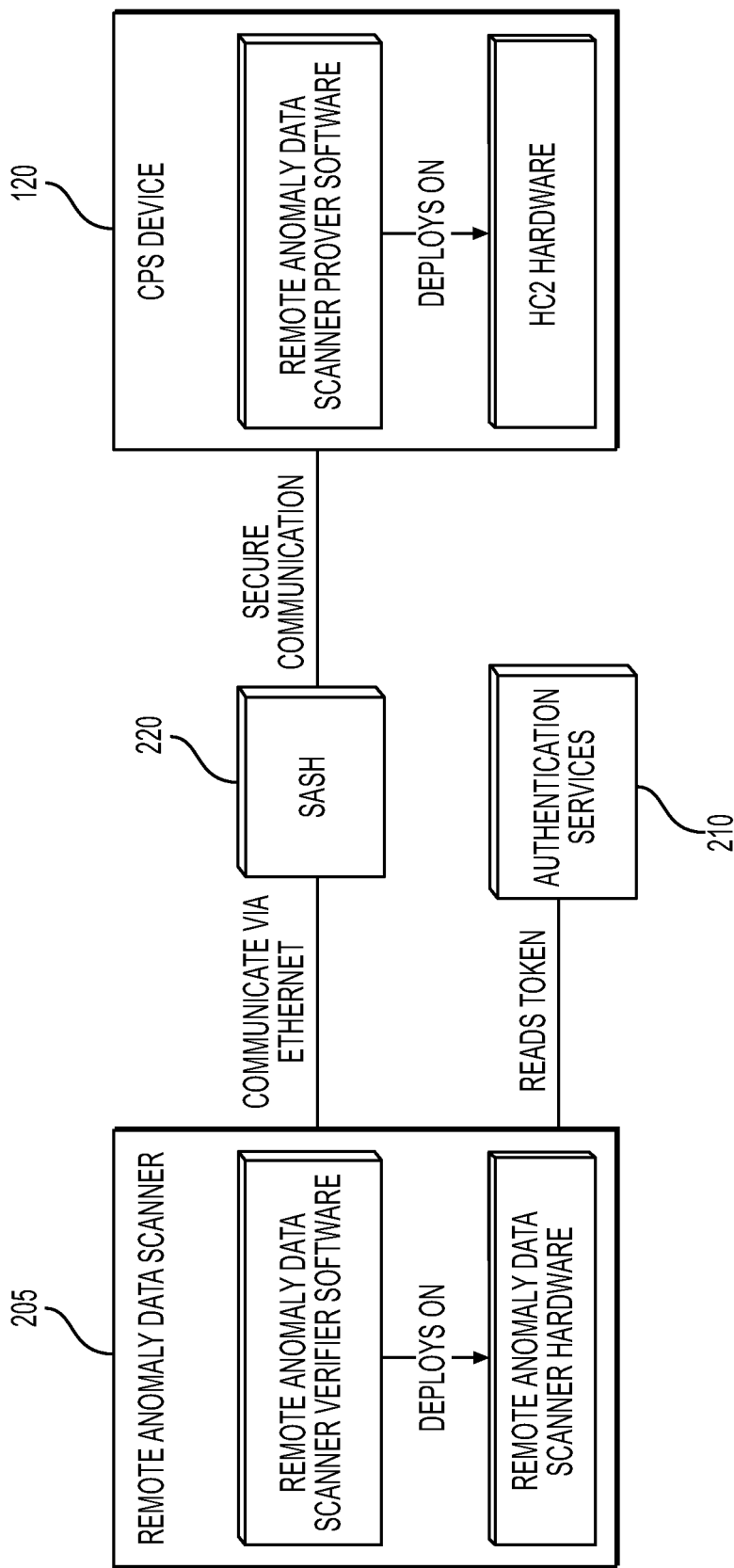
FIG. 3 depicts an example of components and subsystems of the RADS according to some embodiment.

As shown in FIG. 3, the RADS verifier 130 contains software that may be used to authenticate the contents of the CPS Device. The RADS verifier 130 software is described in further detail below.

As shown in FIG. 3, RADS hardware includes the hardware components on which the RADS verifier 130 software may be hosted. RADS hardware is described in further detail below.

As shown in FIG. 3, authentication services 210 may authenticate users seeking to access the RADS verifier software, e.g., for purposes of maintenance or data scanning. For example, the RADS verifier software may be initiated by an authorized user of a bootloader and such authorized users may be authenticated by the authentication services 210 prior to accessing the RADS verifier software.

As shown in FIG. 3, the RADS verifier 130 may use the SASH 220 to connect to the CPS Device 120 and other HC2 technology capabilities (e.g., the security audit logs).

As shown in FIG. 3, the RADS prover 140 contains software that may be used to make measurements on the data stored on the CPS Device 120. The RADS prover 140 software is described in further detail below.

As shown in FIG. 3, HC2 hardware includes the hardware components on which the RADS prover 140 software may be hosted. HC2 hardware is described in further detail below.

Figure 4:
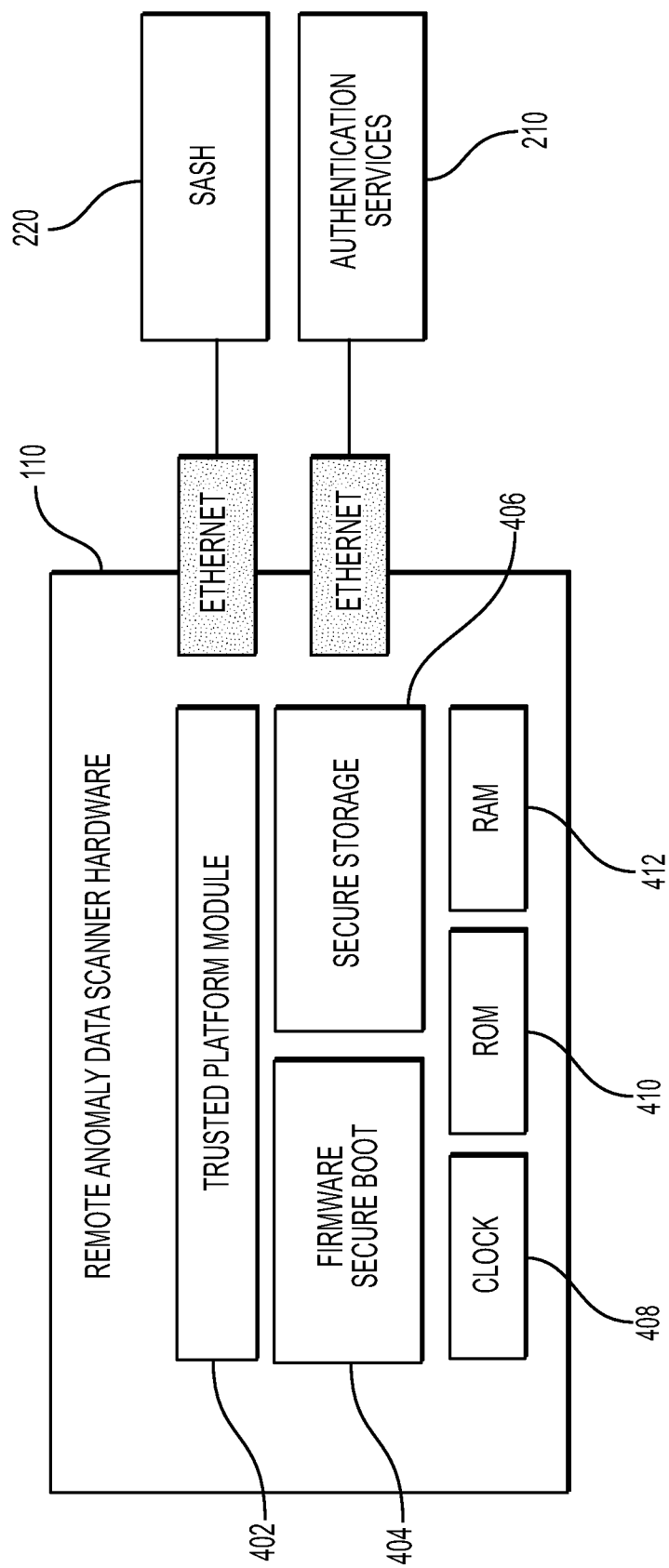
FIG. 4 depicts one or more components of RADS hardware configured to host a RADS verifier according to some embodiments.

FIG. 4 depicts one or more components of RADS hardware 110 configured to host a RADS verifier 130 according to some embodiments. The RADS verifier 130 software may be hosted on the RADS hardware 110.

As shown in FIG. 4, the RADS hardware 110 may include a trusted platform module (TPM) 402, firmware secure boot 404, secure storage 406, clock 408, RAM 410, and ROM 412. TPM 402 may be a secure processor configured to protect and limit access to cryptographic keys. Firmware secure boot 404 may be configured to run the RADS verifier 130 software in a trusted environment. In some embodiments, the trusted environment within the RADS hardware 110 may be setup by the original equipment manufacturer (OEM). Secure storage 406 may be configured to secure data required by the RADS software and ensure that the secure data is access only by the RADS software and/or an authorized user, e.g., a RADS administrator when updating software. RAM 410 may include sufficient memory to execute the RADS software computations. ROM 412 may include sufficient memory to host the RADS software. Clock 408 may be configured to provide accurate time-stamp capabilities for security events.

The RADS verifier 130 may connect to the SASH 220 using a communication port, e.g., Ethernet port. With this connection, the RADS verifier 130 may communicate with the RADS prover 140 software hosted on the HC2 hardware on the CPS device 120.

Figure 5:
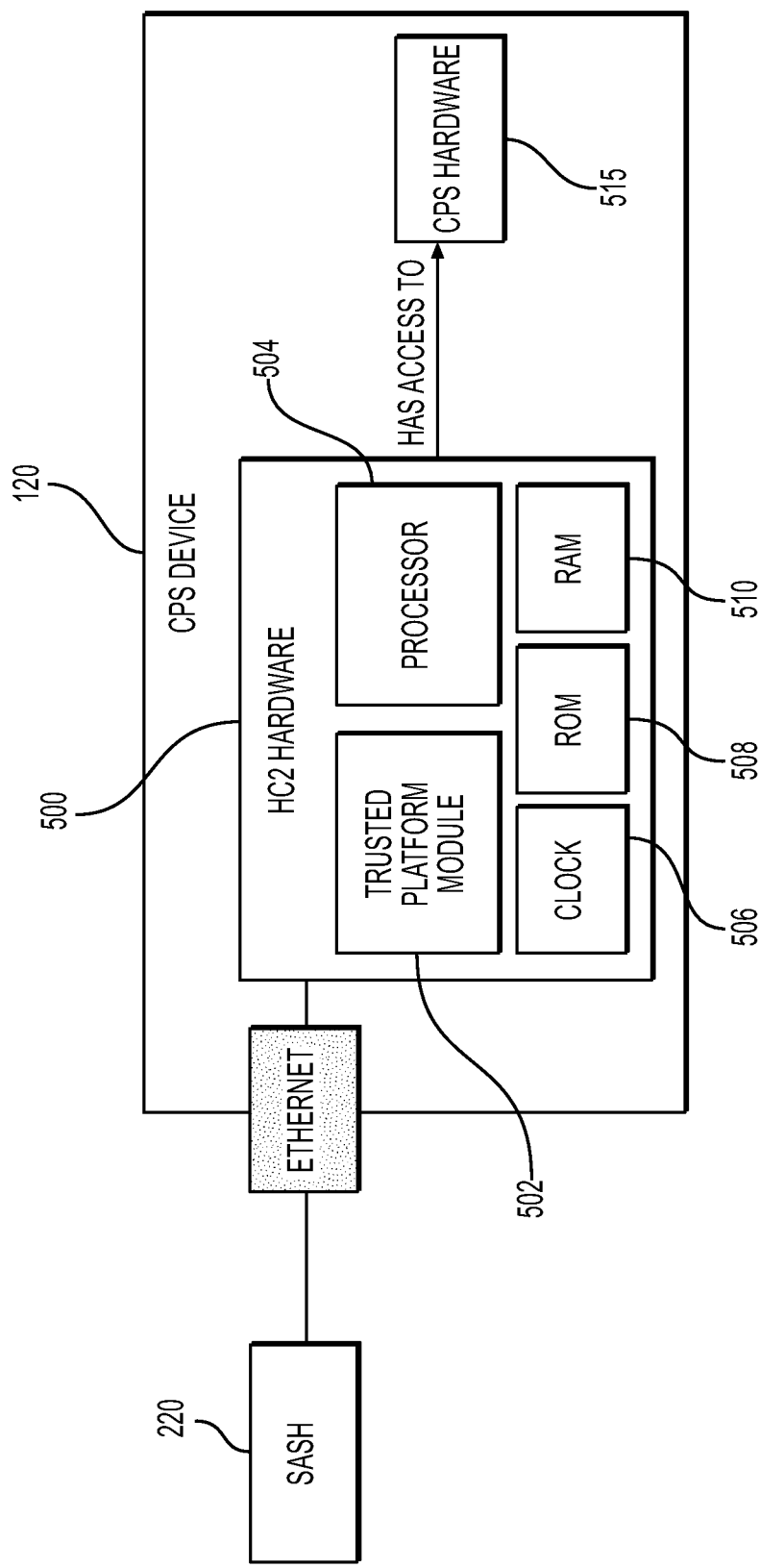
FIG. 5 depicts one or more components of hardware on a device according to some embodiments.

FIG. 5 depicts one or more components of HC2 hardware 500 on the CPS device 120 according to some embodiments. The RADS prover 140 software may be hosted on the HC2 hardware 500 in the CPS device 120.

As shown in FIG. 5, the HC2 hardware 500 may include a trusted platform module 502, a processor 504, a clock 506, ROM 508, and RAM 510 according to some embodiments. The processor 504 may be configured to protection for the RADS prover 140 software. The processor 504 may ensure that the RADS prover 140 software executes at the highest priority with no interruptions and exclusive access to restricted memory locations. Clock 506 may be configured to provide accurate time-stamp capabilities. RAM 510 may include sufficient memory to execute RADS software computations. ROM 508 may include sufficient to host the RADS prover 140 software. As shown in FIG. 5, the HC2 hardware 500 may have access to one or more components of the CPS device 120, e.g., data storage where CPS data is stored. The RADS prover 140 may access the stored CPS data to make measurements as described herein.

The RADS prover 140 may connect to the SASH 220 using a communication port, e.g., Ethernet port. With this connection, the RADS prover 140 may communication with the RADS verifier 130.

As will be explained in further detail below, software components of the RADS 205 may contain processes running on a general-purpose computer in addition to the HC2 hardware of the CPS device 120.

Figure 6:
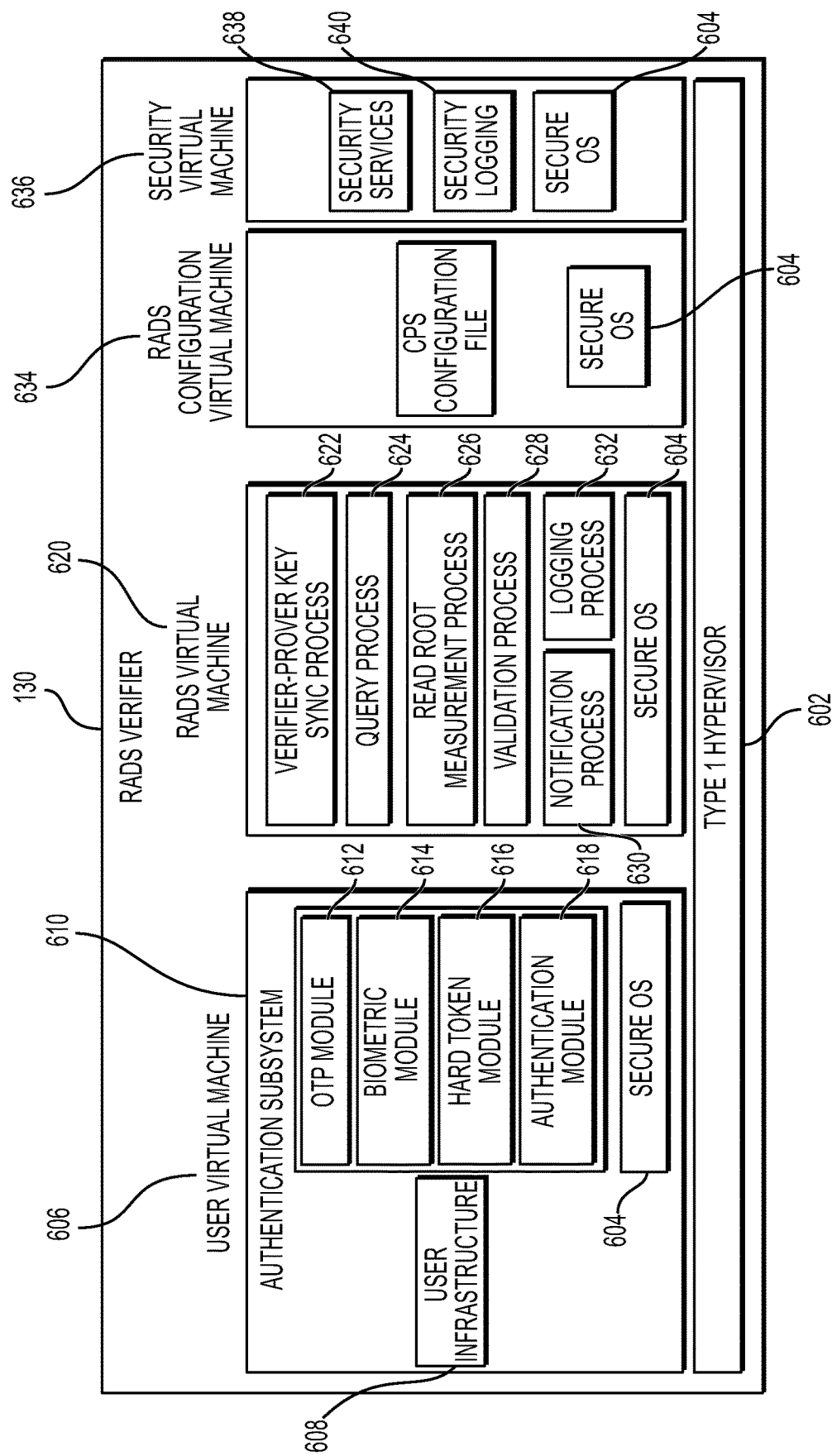
FIG. 6 depicts one or more software components of the RADS verifier according to some embodiments.

FIG. 6 depicts one or more software components of the RADS verifier 130, according to some embodiments.

As shown in FIG. 6, the RADS verifier 130 may include a hypervisor 602. In some embodiments, the hypervisor 602 may be a type-1 hypervisor. The hypervisor 602 on the RADS verifier 130 may configured to manage one or more virtualized RADS verifier 130 machines. The hypervisor 602, e.g., via the one or more virtualized RADS verifier 130 machines, may allow for multiple authorized users to access the RADS system on a single platform while ensuring that their system information remains isolated from other user's information and processes.

As shown in FIG. 6, the RADS verifier 130 may include a secure operating system (OS) 604. The secure OS 604 may be a security enhanced operating system to provide access control, security policies and enforcement, and privilege minimization. The secure OS 604 may interact with the authentication systems to provide access to a user subsystem. In some embodiments, such user subsystems may be an interface to the hypervisor 602 manages the virtualized environments. For example, a virtualization system may include a secure OS providing access to a vSphere client, which interacts with a VMWare ESXi server.

As shown in FIG. 6, the RADS verifier 130 may include a user virtual machine 606. The user virtual machine 606 may provide authorized users access to the virtualized a RADS verifier 130 system instance that corresponds to the individual RADS user. The user virtual machine 606 may include a user infrastructure 608 and authentication subsystem 610 according to some embodiments. The user infrastructure 608 may be used for configuration and maintenance of the virtualization system.

The authentication subsystem 610 may act as a gatekeeper to the RADS verifier 130. The authentication subsystem 610 may allow access only to users with the appropriate multi-factor credentials and allows the system to restrict access to various parts of the system to those users with proper authorization. The authentication subsystem 610 may interact with the logging process to log successful and unsuccessful authorization attempts.

The authentication subsystem 610 may include a one-time password (OTP) authentication module 612. The OTP authentication module 612 may be one of the multi-factor authentication modules that may be used for authorizing access to the RADS verifier 130. The OTP authentication module 612 may use a time based one-time password (TOTP) system.

The authentication subsystem 610 may include a biometric authentication module 614. The biometric authentication module 614 may be one of the multi-factor authentication modules that may be used for authorizing access to the RADS verifier 130. The biometric authentication module 614 may use a biometric feature, such as facial recognition or fingerprint scanning to authenticate a user.

The authentication subsystem 610 may include a hard token authentication module 616. The hard token authentication module 616 may be one of the multi-factor authentication modules that may be used for authorizing access to the RADS verifier 130. The hard token authentication module 616 may use a hard token item, e.g., a smart card or an RFID proximity device, to authenticate a user.

The authentication subsystem 610 may include an authentication client 618. The authentication client 618 may be a process that interacts with the multi-factor modules and an authentication system, e.g., authentication services 210, to verify if the factors presented to the authentication client 618 belong to an authorized user, and the authentication client 618 may use that information in addition to the user's identity to grant access to the system.

As shown in FIG. 6, the RADS verifier 130 may include a RADS configuration virtual machine 634. The RADS configuration virtual machine 634 may allow the selection of which CPS devices the RADS verifier 130 should interact with. In some embodiments, the RADS verifier 130 may monitor all available CPS devices or a subset of available CPS devices.

As shown in FIG. 6, the RADS verifier 130 may include a RADS virtual machine 620. In some embodiments, the RADS virtual machine 620 may be the subsystem that contains the software for the RADS verifier 130.

The RADS virtual machine 620 may include a verifier-prover key sync process engine 622 according to some embodiments. The verifier-prover key sync process engine 622 may include the exchange/synchronization of cryptographic keys between the RADS verifier 130 and the RADS prover 140. In some embodiments, the verifier-prover key sync process engine 622 may interact with the logging process engine to record significant information.

The RADS virtual machine 620 may include a query process engine 624 according to some embodiments. The query process engine 624 may communicate with the RADS prover 140 on the HC2 Hardware on the CPS device 120 and request a measurement of the data 145 on the CPS device 120. In some embodiments, the query process engine 624 may be initiated by a RADS administrator or configured to be initiated at predetermined intervals. The query process engine 624 may interact with the logging process engine to record significant information.

The RADS virtual machine 620 may include a read root measurement process engine 626 according to some embodiments. The read root measurement process engine 626 may read the stored initial root measurement. The initial root measurement may indicate the root/initial data measurement performed on the CPS device 120 when the RADS prover 140 software was installed on the CPS device 120. The read root measurement process may be initiated by the validation process engine 628 as will described below.

The RADS virtual machine 620 may include a validation process engine 628 according to some embodiments. The validation process engine 628 may determine the authenticity of measurements received from the RADS prover 140. The validation process engine 628 may compare the received measurement to the expected root measurement, e.g., the stored initial root measurement. The validation process engine 628 may determine whether the received measurement does not match the stored root measurement and generate an alert, via notification process engine 630, if the received measurement does not match the stored root measurement. The validation process engine 628 may initiate the read root measurement process and interact with the logging process engine to record significant information.

The RADS virtual machine 620 may include a logging process engine 632 according to some embodiments. The logging process engine 632 may receive logging requests from other process engines in the virtual machine 620 and record the included information in the appropriate log file for future analysis. The logging process engine 632 may also manage access to the log files, restricting access to roles that are authorized to perform actions on those files such as reading or writing to the logs.

As shown in FIG. 6, the RADS verifier 130 may include a security subsystem 636. The security subsystem 636 may include a security services engine 638 that according to some embodiments. The security services engine 638 may collaborate with the authentication subsystem 610 to validate users of the RADS software. The security services engine 638 may grant access to the RADS system only to those users with the appropriate credentials, and users without proper credentials are restricted from the parts of the system that they are not authorized to access. The security services engine 638 may also interact with the logging process to log successful and unsuccessful authorization attempts.

The security subsystem 636 may include a security logging process engine 640 according to some embodiments. The security logging process engine 640 may receive logging requests from the other processes, e.g., user virtual machine 606, RADS virtual machine 620, RADS configuration virtual machine 634, etc., and records the included information in the appropriate log file for future analysis. The security logging process engine 640 may also manage access to the log files, restricting access to only those roles that are authorized to perform actions on those files such as reading or writing to the logs.

Figure 7:
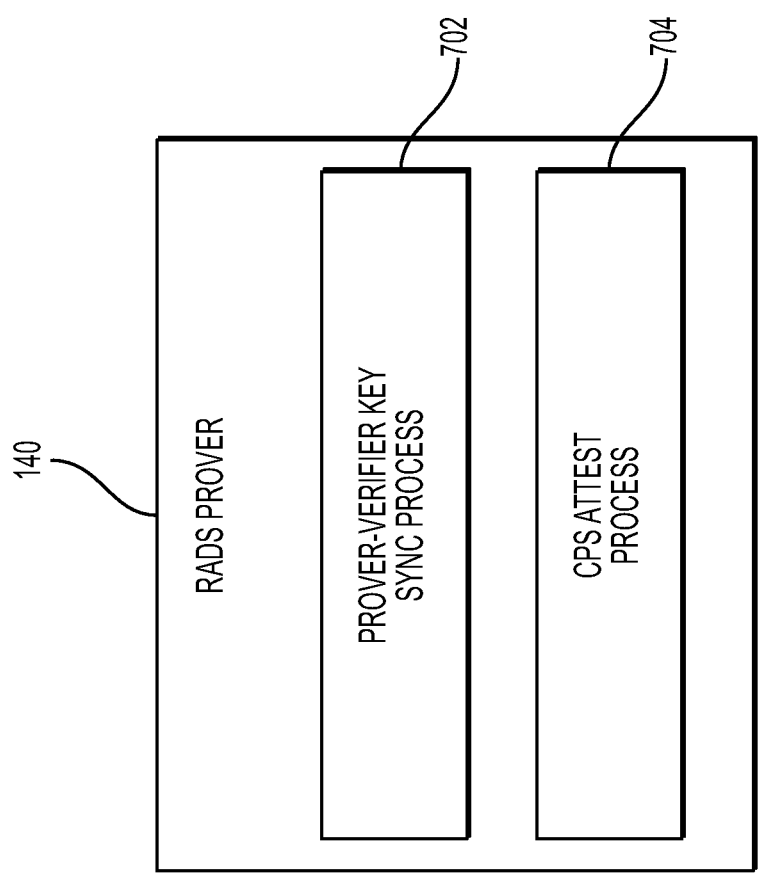
FIG. 7 depicts one or more software components of the RADS prover according to some embodiments.

FIG. 7 depicts one or more software components of the RADS prover 140, according to some embodiments. As described above, the one or more software components RADS prover 140 may be located on the HC2 hardware on the CPS device 120. The RADS prover 140 may interact with data stored on the CPS device 120 and the SASH network 220 for communicating with the RADS verifier 130.

As shown in FIG. 7, the RADS prover 140 may include a prover-verifier key sync process engine 702 according to some embodiments. The prover-verifier key sync process engine 702 may handle the exchange/synchronization of cryptographic keys between the RADS prover 140 and the RADS verifier 130. The prover-verifier key sync process engine 702 may initiate the exchange/synchronization of cryptographic keys when the RADS verifier 130 sends a request for key synchronization. At the end of the exchange/synchronization of cryptographic keys, the RADS verifier 130 and the RADS prover 140 share a public/private key pair which may be used for authenticating requests.

As shown in FIG. 7, the RADS prover 140 may include a CPS attest process engine 704 according to some embodiments. The CPS attest process engine 704 may run on the CPS device 120 that may listen on the SASH network 220 for an attestation request from the virtualized RADS verifier query process engine 624. The CPS attest process engine 704 may perform measurements on static data (binaries, firmware, etc.) stored on the CPS device 120 and sends a response to the RADS verifier 130.

Figure 8:
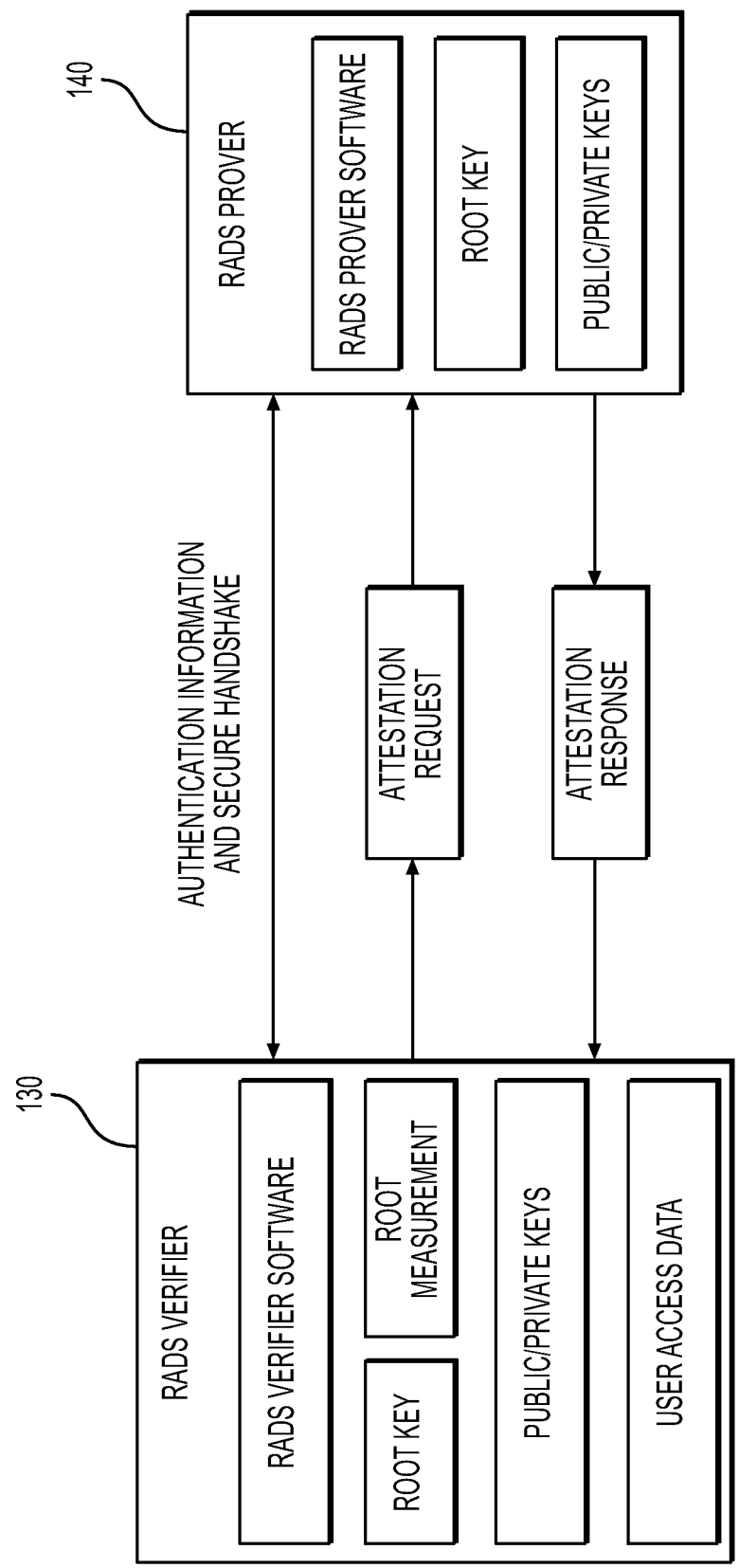
FIG. 8 depicts a data view of the RADS according to some embodiments.

FIG. 8 depicts a data view of the RADS 205 according to some embodiments. As shown in FIG. 8, the RADS 205 includes two sets of data: RADS verifier 130 data and RADS prover 140 data. In some embodiments, RADS verifier 130 data may be located on a server, e.g., CPS Enterprise Server, and the RADS prover 140 data may be located on the HC2 hardware of the CPS device 120. The data that passes through the RADS 205 may be a packaged request to (and response from) the CPS device 120, the authentication and security handshake data between the RADS verifier 130 and the RADS prover 140 may facilitate secure connection, and attestation messages may be exchanged between the RADS verifier 130 and the RADS prover 140. The flow of this data is described in further detail below with reference to FIG. 8.

As described above, RADS verifier 130 software may be a collection of data and executable files. The RADS verifier 130 software may be used to send requests to, and validate responses from, the CPS device 120. The RADS verifier 130 software may also include executables, libraries, and configuration data files for the hypervisor and each of the virtual machines running under the hypervisor.

In some embodiments, the RADS verifier 130 software may include RADS verifier security data according to some embodiments. RADS verifier security data may include security logs and encryption/decryption data for communicating with the SASH 220.

In some embodiments, the RADS verifier 130 software may include verifier data according to some embodiments. Verifier data may include a root key that may be generated when the RADS verifier 130 software is assigned to a hardware platform. Verifier data may also include public and/or private keys that may be used to authentic messages from the RADS prover 140. In some embodiments, a key pair may be generated at startup of the RADS verifier 130.

In some embodiments, RADS verifier 130 software data may include a root measurement. As described herein, the root measurement may be an initial measurement of the data on the CPS device 120. In some embodiments, this root measurement may be obtained by the RADS verifier 130 after installing the RADS prover 140 on the CPS device 120. The root measurement may be transferred from the RADS prover 140 to the RADS verifier 130 and stored on the RADS verifier 130 hardware.

In some embodiments, RADS verifier 130 software data may include RADS verifier 130 access data. For example, RADS verifier 130 access data may include login information for various users of the RADS verifier 130.

As described above, RADS prover 140 may be a collection of data and executable files. The RADS prover 140 software may be located on the HC2 hardware of the CPS device 120. The RADS prover 140 software may be used to make measurements on the data stored on the CPS device 120.

In some embodiments, the RADS prover 140 software may include RADS prover data. For example, RADS prover data may include a root key that may be created and stored in the HC2 hardware when the CPS device 120 is built. In some embodiments, the root key may be protected by the Trusted Platform Module of the CPS device 120. As another example, RADS prover data may include public and/or private keys that may be used to authenticate messages from the RADS verifier 130. In some embodiments, such key pairs may be generated at startup of the RADS verifier 130.

Figure 9:
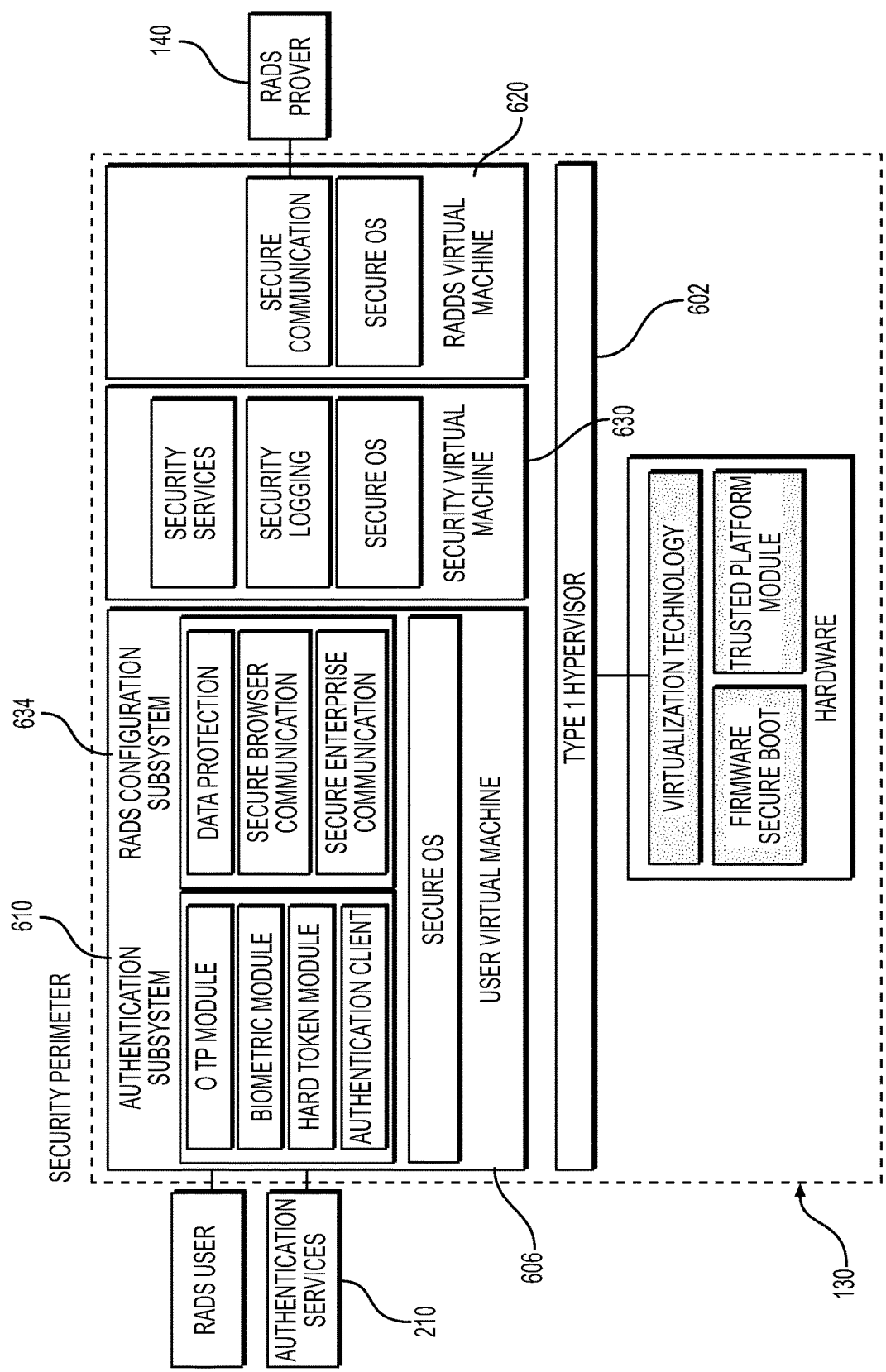
FIG. 9 depicts a security view of the RADS verifier according to some embodiments.
Figure 10:
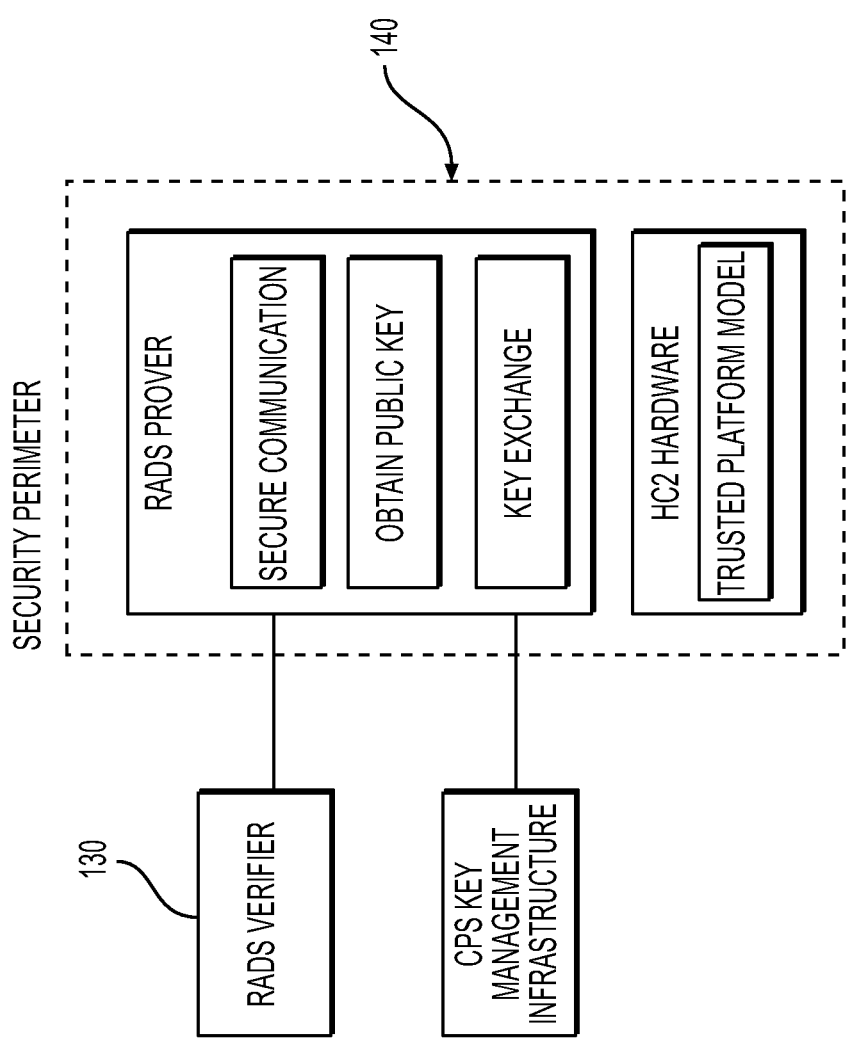
FIG. 10 depicts a security view of the RADS prover on the CPS device according to some embodiments.

FIGS. 9 and 10 depict security views of the RADS verifier 130 and RADS prover 140, respectively, according to some embodiments.

This section describes the security view of the RADS system. FIG. A8 shows the Customer RADS view and FIG. A9 shows the security view of the RADS portion on the CPS device.

FIG. 10 depicts a security view of the RADS prover 140 on the CPS device 120 according to some embodiments. As described above, the RADS prover 140 may be a software that may be deployed onto the HC2 hardware of the CPS device 120. In the context of the current disclosure, the HC2 hardware may be an argument hardware within the CPS device 120. The RADS prover 140 may take an attestation measurement and send the measurement to the RADS verifier 130. The RADS prover 140 may take the measurement when requested by the RADS verifier 130. The following security components may be implemented to protect the RADS prover 140 from malicious or unintended activities: (i) root key, (ii) public key, and (iii) secure communication. With reference to the root key, the RADS prover 140 may be deployed on HC2 Hardware, which has a TPM to host the root key to assure root-of-trust. With reference to the public key, the RADS prover 140 may use the root key in the HC2 Hardware TPM to request a CPS Certificate Authority for a Public/Private keys pair. When the RADS verifier 130 is initiated, the RADS verifier 130 may exchange public keys with the RADS prover 140 to assure the authenticity and confidentiality of the request and response for the measurement. The secure communication may assure integrity, confidentiality, and authenticity of the interaction between the RADS verifier 130 and RADS prover 140.

FIG. 9 depicts a security view of the RADS verifier 130 according to some embodiments. As described above, the RADS verifier 130 may execute on a server, e.g., a CPS Enterprise Security Services Server. The server may be a general-purpose hardware platform. The RADS verifier 130 may be protected by the following one or more security components as will be described in further detail below.

The RADS verifier 130 may depend on security provided by the hardware platform for the RADS verifier 130. In some embodiments, the security provided by the hardware platform may support secure boot, integrity check, and root-of-trust. In some embodiments, such provided security features may include a trusted platform module and/or a firmware secure boot.

The hardware platform for the RADS verifier 130 may support a type 1 hypervisor that may provide process and data separation for multiple users on a single customer platform, ensuring that system information and contents remain isolated from other users' processes and information. In some embodiments, the RADS verifier 130 may instantiate three virtual machines to separate the user related activities from the RADS verification activities in addition to the security services for the RADS verifier 130.

The hardware platform for the RADS verifier 130 may include a secure OS. The RADS verifier 130 may satisfy certain integrity and authenticity requirements by assuring that the RADS verifier 130 is booted to the secure OS by using the secure boot provided by the hardware platform. Before a kernel module is launched, the bootloader may measure the various kernel modules and authenticate using Remote Attestation supported by the hardware and operating system boot process. In some embodiments, the last step of the boot process may be to check for malware. It is understood that when the operating systems (in the various domains) are booted, the RADS verifier 130 is ready to authenticate users. In some embodiments, access may be controlled using discretionary access control and mandatory access control. In the context of the current disclosure discretionary access control refers to an access control policy that may enforce access based on the identity and need-to-know, and can be given to another subject based on the discretion of the granter. In the context of the current disclosure, mandatory access control refers to an access control policy that may be enforced uniformly across the entire system and may be granted by a central authority and cannot be changed.

The RADS verifier 130 may protect user access by enabling user multi-factor authentication. In some embodiments, RADS verifier 130 may be designed to use the CPS deployment environment authentication services, e.g., authentication services 210, to provide a homogeneity and single sign-on solution. However, if the CPS device 120 does not have an authentication service, the RADS verifier 130 may provide a framework for selecting and deploying an authentication service. Furthermore, the RADS verifier 130 may disable any user once it exceeds its allowable attempt. The number of allowable attempted may be configurable.

The RADS verifier 130 may provide a secure remote configuration so that an administrator may customize the data scan feature as needed. In some embodiments, the secure remote configuration may be directed to local access, which may be protected by the multi-factor authentication. In some embodiments, the secure remote configuration may be directed to remote access, the RADS verifier 130 may use HTTPS to provide the customization activities using a browser and/or mobile application.

The RADS verifier 130 may provide a customer RADS authentication infrastructure that may control access to the system. The authentication infrastructure may ensure only authorized users are able to access the system.

The RADS verifier 130 may establish secure communications with the RADS prover 140. Communications between the security perimeters of the RADS verifier 130 and the SASH 220 may be protected using a secure channel to set up confidential and authenticated channels between the two devices. Similarly, a secure channel may be used to establish confidential and authenticated channels between the SASH and the CPS devices. Depending on the network technology used by the CPS devices this may require modifying the networking stack to add a secure channel layer above the data-link layer. The SASH may then act as a bridge, decapsulating the traffic, e.g., Ethernet traffic, from the RADS verifier and re-encapsulating it for the network protocol used by the CPS device and sending it across the secure channel.

An example of a dynamic view of the RADS 205 system may be described in the following non limiting sections: installation, startup, and execution.

An example of an installation of the RADS 205 system may be described as follows. A CPS supplier may manufacture the CPS device 120. During the manufacturing process, the CPS supplier may use a cryptographic module to create a unique key (also referred to herein as a root key). This key may be installed onto the TPM of the HC2 hardware, which is connected to the CPS device 120. The CPS supplier may install the RADS prover 140 on the HC2 hardware and may use the root key to make an initial root measurement of the data on the CPS device 120. This root measurement may be transferred to the RADS verifier 130. The RADS verifier 130 may be installed on the CPS Enterprise Security Service general-purpose platform and the received root measurement from the CPS device 120 may be installed in the TPM of the CPS Enterprise Security Service general-purpose platform.

An example of a startup of the RADS prover 140 on the CPS device 120 may be described as follows. When the CPS device 120 starts, the RADS prover 140 may startup. Upon start up, the RADS prover 140 may communicate with the RADS verifier 130 to exchange public keys.

An example of a startup of the RADS verifier 130 on the CPS Enterprise Security Services Server may be described as follows. A RADS administrator may start up the RADS verifier 130. In some embodiments, the RADS administrator may communicate with the CPS Certificate Authority to obtain public/private keys pair. The RADS verifier 130 may stores the original root measurement from the RADS Prover 140 in its TPM. The RADS administrator may configure the scan cluster and frequencies. The RADS verifier 130 and one or more RADS provers 140 may negotiate for each respective public keys. The RADS verifier 130 may initiate a check of the CPS devices 120 specified by the configured scan cluster. In this check, the RADS verifier 130 may negotiate for public/private keys with the CPS devices so that encrypted communications between them may be authenticated.

An example of the execution may be described as follows. During execution, as specified in the scan cluster configuration file, the RADS verifier 130 may send a query to the RADS prover 140. The RADS prover 140 may take measurements of the data and return a response to the RADS verifier 130. The RADS verifier 130 may then check the response with the original measurement. A deviation from the desired response may indicate that data stored on the embedded device is not in the expected state, hence an anomaly.

In some embodiments, the root key for the RADS prover 140 may be generated by the CPS supplier when the CPS device 120 is manufactured. The root key may then be installed in the HC2 hardware on the CPS device 120 and protected by the Trusted Platform Module.

In some embodiments, the RADS verifier root key may be installed when the RADS verifier software is assigned to a hardware platform.

As described above, the Remote Anomaly Data Scanner (RADS) may be a combination of hardware and software components for remotely detecting anomalies in data stored on an embedded device (e.g. CPS device 120).

The RADS may provide the following capabilities: (i) ascertain the authenticity of data stored on the CPS device 120, (ii) record results to a log resident on the local device, (iii) send notifications to outside recipients for critical event logging and alerts, and (iv) detection, logging and notification capabilities may be controlled through configuration file(s). The RADS may take measurements on data installed on the CPS device 120 to determine the authenticity of the data. This data may include firmware/binaries and/or configuration files.

The RADS may be a combination of hardware and software components for detecting anomalies in data stored on the cyber-physical system (CPS) device (e.g. a CPS). The RADS may monitor data (e.g. firmware, binaries, and configuration files) stored on the CPS device 120 for malicious activity. To achieve this objective, the RADS is constructed using a security method called Remote Attestation (RA) in combination with the HC2 Secure Access Smart Hub (SASH). As will be described herein, RA may be a method by which a trusted device (e.g. server) can remotely authenticate the contents of a separate device (e.g. embedded device). Using this method, the RADS may monitors firmware and configuration files stored on the CPS device for malicious activity.

RADS may provide the following, non-limiting, benefits: (i) detect anomalies in firmware stored on the CPS device, (ii) detect anomalies in configuration files stored on the CPS device, (iii) log security-related events for subsequent audits, and (iv) generate notifications for critical security events. The RADS may be usable on most devices that require the ability to remotely monitor and detect abnormalities in data files (e.g. firmware, binaries, executables, log files, configuration files) stored on remote systems (e.g. avionics, CPS, controllers). This may enable remote authentication of system files and executables stored on remote devices.

RADS may provide the following, non-limiting, certification benefits: moderate impact level of NIST RMF using NIST SP 800-53 security controls to assure that the RADS is assessable and authorized in accordance to NIST RMF.

In some embodiments, the RADS described herein may adhere to the following CPS requirements: (i) CPS shall employ internal integrity verification tools to detect unauthorized modification to programming or data, (ii) CPS shall perform configurable pre-defined actions if anomalies are detected or communications are interrupted, and (iii) CPS shall perform pre-defined actions if anomalies are noted during integrity data verification (e.g. malware discovered, corrupted data).

Figure 11:
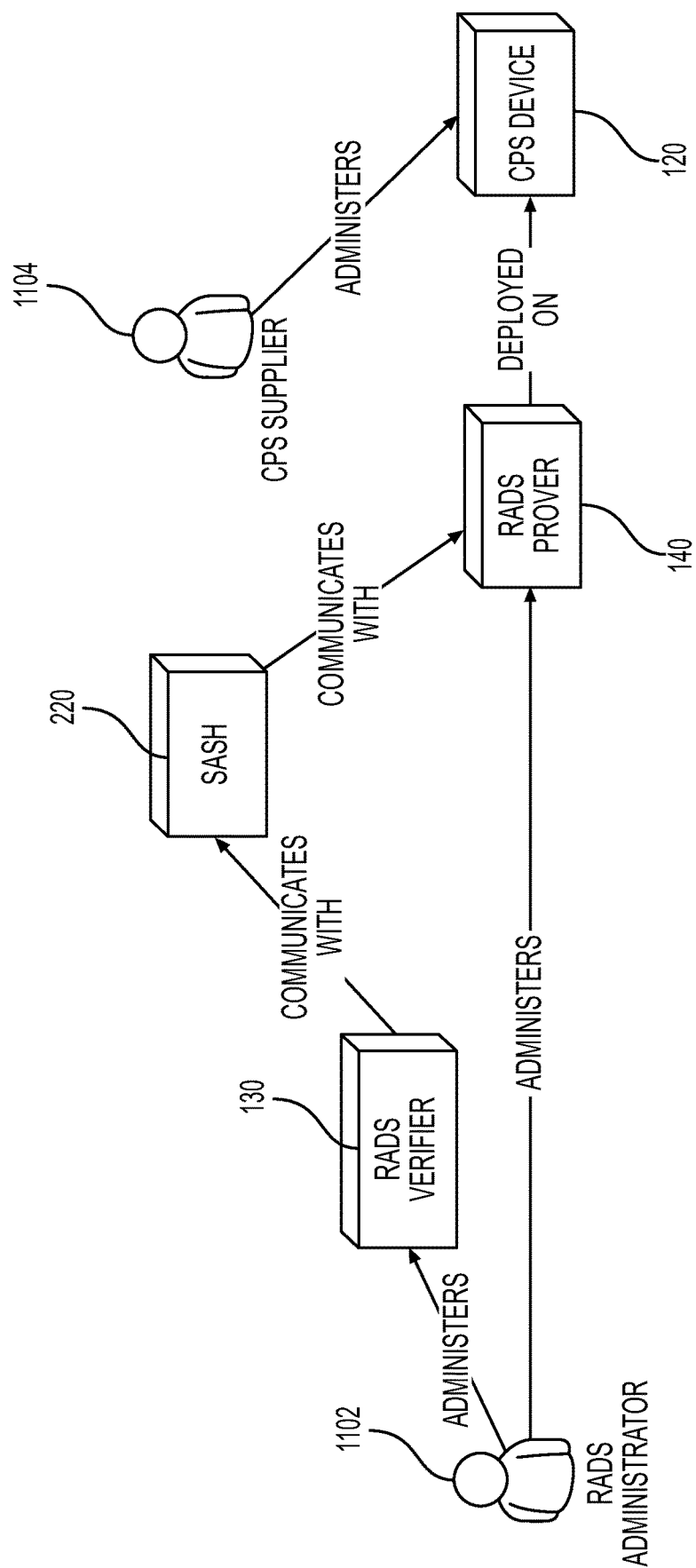
FIG. 11 depicts an example environment in which methods, systems, and other aspects of the present disclosure may be implemented according to some embodiments.

With reference to FIG. 11 depicting an example environment in which the RADS may be implemented, context for the RADS is described below. As shown in FIG. 11, the environment may include a CPS device 120. The CPS device 120 may contain the computing platform for the RADS prover 140, the RADS prover 140 software, and data that the RADS monitors. In some embodiments, the compute platform for CPS devices 120 may have two executables (e.g., bootloader and main program) running on a DSP without an operating system and minimal resources.

The environment may include a secure server, e.g., a CPS Enterprise Security Server. The secure server may host various CPS security services for the RADS verifier 130 and the RADS verifier 130 software. In some embodiments, the RADS system may be deployed on any platform.

The environment may include a RADS administrator 1102. In some embodiments, RADS administrator 1102 may interact with the RADS system locally or remotely, with varying degrees of visibility depending on the device. For example, the RADS administrator may: (i) install the RADS verifier 130 on a secure server, and (ii) install the initial/root measurement(s) for the CPS device(s) 120 monitored by the RADS verifier 130 using a Secure Maintenance Device (SMD).

The environment may include a CPS supplier 1104. The CPS supplier 1104 may interact with the RADS system locally, with the following, non-limiting, abilities: (i) create and install initial cryptographic keys on the RADS system hosted on the CPS device, and (ii) install the RADS prover 140 software on the CPS device 120.

In some embodiments, the CPS device 120 may include: (i) CPS device startup software that starts software on the CPS device when the CPS device is powered on, (ii) CPS device shutdown software that shuts down the CPS device, (iii) CPS device security log software that may be a file that records information about the CPS device status and messages, and the RADS sends messages to this log file, (iv) CPS device program file that may be the program file(s) pertaining to the software on the CPS device, and the RADS may monitor this program file for anomalies, (v) CPS device data file that may be the data file(s) of the program(s) on the CPS device, and the RADS may monitor these files for anomalies.

A summary of the capabilities of the RADS includes, but is not limited to, the following: (i) monitor program files on a remote device (e.g., CPS device) for anomalies, (ii) monitor configuration on a remote device (e.g., CPS device) data/files for anomalies, (iii) save relevant information to a log (e.g. time of scanning request event, duration of scanning).

In some embodiments, the RADS may interact with a CPS controller to obtain access to data (program files, configuration files, etc.) stored on the CPS device.

With reference to FIGS. 12A-12G, an example use case of the RADS is described below.

Figure 12B:
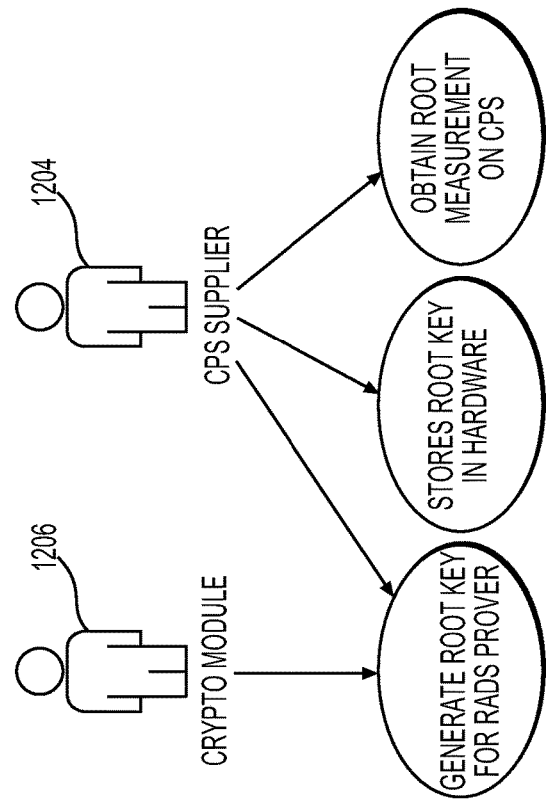
Figure 12A:
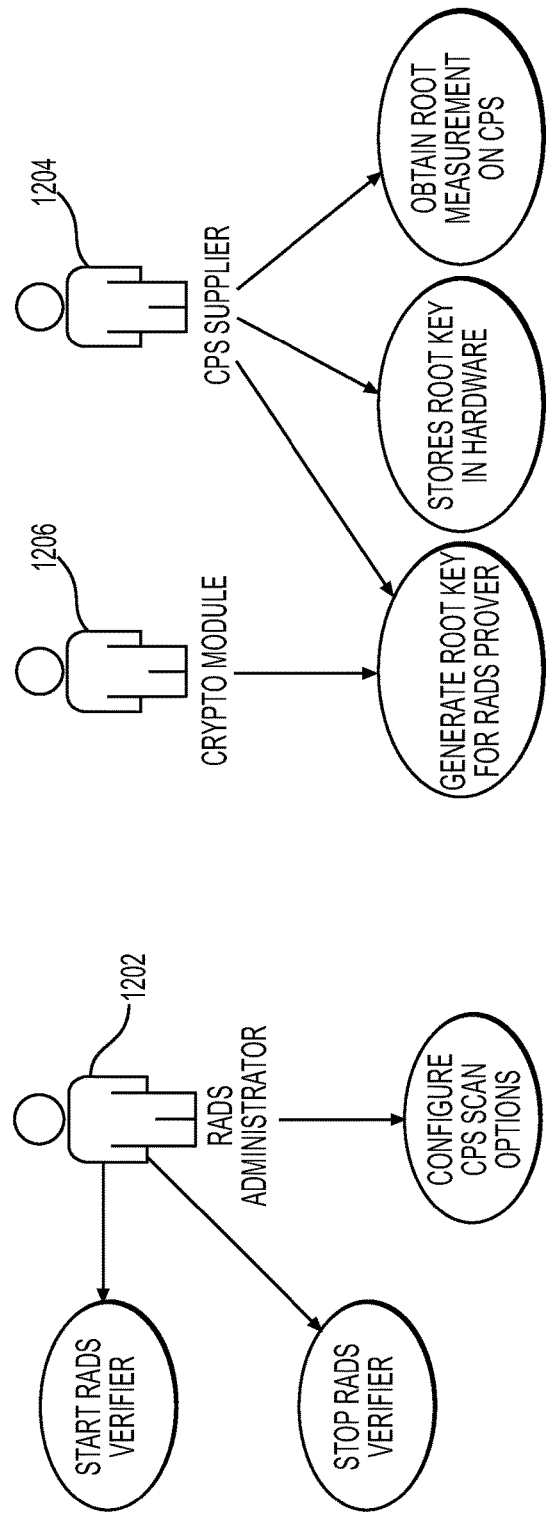

As shown in FIG. 12A, a RADS administrator 1202 may be a user who interacts with the RADS to perform factory setup/installation on the CPS device and interacts with the RADS on the secure server. The RADS administrator 1202 may start the RADS verifier, stop the RADS verifier, and/or configure the CPS device scan options.

In some embodiments, RADS administrator 1202 may start the RADS verifier by logging into the secure server. The RADS verifier may not start execution in response a start RADS verifier command from any other source. In some embodiments, the RADS verifier may log each start RADS command, to include valid and invalid commands, and to include relevant security parameters.

In some embodiments, RADS administrator 1202 may stop the RADS verifier by logging onto the secure server. The RADS verifier may not terminate execution in response a stop RADS command from any other source. The RADS may log each stop RADS command, to include valid and invalid commands, and to include relevant security parameters.

In some embodiments, RADS administrator 1202 may configure CPS scan options. The RADS administrator may configure the CPS scanning options on the RADS verifier software. The configuration may indicate which CPS devices that the RADS verifier may communicate with.

As shown in FIG. 12B, a CPS supplier 1204 may be a user who interacts with the CPS to perform factory setup of the CPS device 120. The CPS supplier 1204 may: (i) generate a root key for RADS prover using a crypto module 1206, (ii) store the root key in hardware of RADS prover, and (iii) obtain root measurement on the CPS device.

In some embodiments, CPS supplier 1204 may generate the root key for RADS prover using the crypto module 1206 by generating an initial cryptographic key for the RADS prover installed on the CPS device using the crypto module 1206.

In some embodiments, CPS supplier 1204 may store the root key in hardware of RADS prover by storing the generated root key in the HC2 hardware on the CPS device.

In some embodiments, CPS supplier 1204 may obtain root measurement on the CPS device by obtain an initial/root measurement of the data on the CPS device using the RADS prover.

Figure 12C:
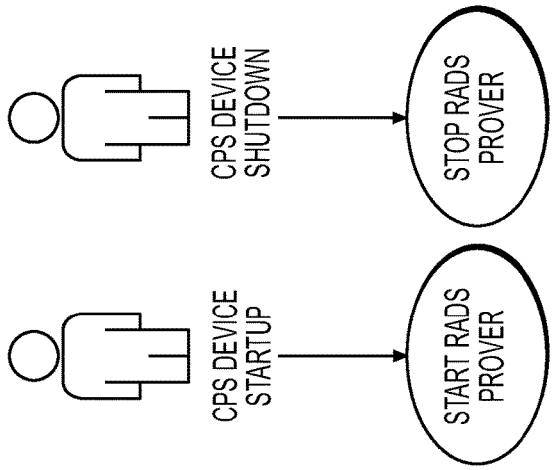

As shown in FIG. 12C, a CPS device may be a cyber-physical system that hosts the RADS-prover software. The CPS device may start the RADS prover and stop the RADS prover. In some embodiments, the CPS device may be capable of a startup process that can launch the RADS prover. In some embodiments, the CPS device may be capable of a shutdown process that can stop the RADS prover.

As shown in FIG. 12D, the CPS device programs and data may be utilized. In some embodiments, CPS device programs and data may be software, files, and parameters that are resident on CPS and which the RADS monitors. In some embodiments, the CPS devices may, with reference to RADS monitoring, expose any stored firmware, binaries, configuration files to the RADS, and decrypt any encrypted files as needed for monitoring by the RADS. In some embodiments, the CPS device may need to communicate with the HC2 hardware.

As shown in FIG. 12D, the RADS prover may take measurements on the CPS data. In some embodiments, the RADS prover may monitor data stored on the CPS device for anomalies. For example, the RADS prover may check installed files (e.g., software and data) on the CPS device for anomalies. As another example, the RADS prover may save salient information to a log to support, e.g., security audits.

As shown in FIG. 12E, a RADS verifier may: (i) obtain a public key from the CPS Certificate Authority, and (ii) exchange public keys with the RADS prover. For example, the RADS verifier may obtain security keys from the CPS Certificate Authority. As another example, The RADS verifier may exchange keys with the RADS prover.

As shown in FIG. 12F, a RADS prover may: (i) obtain a public key from the CPS Certificate Authority, and (ii) exchange public keys with the RADS verifier. For example, the RADS prover may obtain security keys from CPS Certificate Authority. As another example, the RADS prover may exchange keys with the RADS verifier As shown in FIG. 12E, a secure server may be hardware on which the RADS verifier may be installed. The secure server may receive notifications from the RADS verifier.

In some embodiments, CPS file data may be data-aggregations installed on the CPS device. For example, CPS file data may include: CPS Firmware (binary file), CPS Program(s) (executable file), CPS Configuration(s) (parameter values in supplier-specific format), CPS Instructions/Help (text/graphic files in supplier-specific format), CPS Root Measurement (the initial measurement of the data on the CPS device), and/or CPS Current Measurement (the current measurement of the data on the CPS device). The RADS monitoring may cover the file data on the CPS device. The RADS monitoring may cover the configuration files on the CPS device.

In some embodiments, RADS data may include: RADS Program(s) (executable file), RADS Configuration (supplier-specific format), RADS Verifier Root Key (the root key of the RADS verifier), RADS Prover Root Key (the root key of the RADS Prover), RADS Verifier Public/Private Keys (the public/private keys of the RADS Verifier), and/or RADS Prover Public/Private Keys (the public/private keys of the RADS Prover).

In some embodiments, the RADS verifier may require the following kernel requirements: (i) trusted platform module that provides security for cryptographic keys, and (ii) a secure boot to ensure that the RADS verifier runs in a trusted environment. In some embodiments, the RADS prover may require the following kernel requirement: a trusted platform module to provide security for cryptographic keys.

In some embodiments, the RADS may protect itself and sensitive data and communications from accidental, malicious, or unauthorized access, use, modification, destruction, or disclosure. Security requirements of the RADS may implement security controls that allow the RADS to meet the NIST SP 800-53 requirements such that the RADS meets moderator assurance impact level.

For example, technical moderate impact requirements from NIST SP 800-53 that shall be implemented by the RADS are provided in the table below.

| Number | Title | Description |
| --- | --- | --- |
| AC-4 | Information Flow Enforcement | The information system enforces approved authorizations for controlling the flow of information within the system and between interconnected systems in accordance with applicable policy. |
| AC-5 | Separation of Duties | The organization: Separates duties of individuals as necessary, to prevent malevolent activity without collusion; Documents separation of duties; and Implements separation of duties through assigned information system access authorizations. |
| AC-6 | Least Privilege | The organization employs the concept of least privilege, allowing only authorized accesses for users (and processes acting on behalf of users) which are necessary to accomplish assigned tasks in accordance with organizational missions and business functions. |
| AC-7 | Unsuccessful Login Attempts | The information system: Enforces a limit of [Assignment: organization-defined number] consecutive invalid login attempts by a user during a [Assignment: organization-defined time period]; and Automatically [Selection: locks the account/node for an [Assignment: organization-defined time period]; locks the account/node until released by an administrator; delays next login prompt according to [Assignment: organization-defined delay algorithm]] when the maximum number of unsuccessful attempts is exceeded. The control applies regardless of whether the login occurs via a local or network connection. |
| AC-8 | System Use Notification | The information system: Displays an approved system use notification message or banner before granting access to the system that provides privacy and security notices consistent with applicable federal laws, Executive Orders, directives, policies, regulations, standards, and guidance and states that: (i) users are accessing a U.S. Government information system; (ii) system usage may be monitored, recorded, and subject to audit; (iii) unauthorized use of the system is |

| Number | Title | Description |
|---|---|---|
| | | prohibited and subject to criminal and civil penalties; and (iv) use of the system indicates consent to monitoring and recording; Retains the notification message or banner on the screen until users take explicit actions to log on to or further access the information system; and For publicly accessible systems: (i) displays the system use information when appropriate, before granting further access; (ii) displays references, if any, to monitoring, recording, or auditing that are consistent with privacy accommodations for such systems that generally prohibit those activities; and (iii) includes in the notice given to public users of the information system, a description of the authorized uses of the system. |
| AC-11 | Session Lock | The information system: Prevents further access to the system by initiating a session lock after [Assignment: organization-defined time period] of inactivity or upon receiving a request from a user; and Retains the session lock until the user reestablishes access using established identification and authentication procedures. |
| AC-18 | Wireless Access | The organization: Establishes usage restrictions and implementation guidance for wireless access; Monitors for unauthorized wireless access to the information system; Authorizes wireless access to the information system prior to connection; and Enforces requirements for wireless connections to the information system. |
| AU-2 | Auditable Events | The organization: Determines, based on a risk assessment and mission/business needs, that the information system must be capable of auditing the following events: [Assignment: organization-defined list of auditable events]; Coordinates the security audit function with other organizational entities requiring audit-related information to enhance mutual support and to help guide the selection of auditable events; Provides a rationale for why the list of auditable events are deemed to be adequate to support after-the-fact investigations of security incidents; and Determines, based on current threat information and ongoing assessment of risk, that the following events are to be audited within the information system: [Assignment: organization-defined subset of the auditable events defined in AU-2 a. to be audited along with the frequency of (or situation requiring) auditing for each identified event]. |
| AU-3 | Content of Audit Records | The information system produces audit records that contain sufficient information to, at a minimum, establish what type of event occurred, when (date and time) the event occurred, where the event occurred, the source of the event, the outcome (success or failure) of the event, and the identity of any user/subject associated with the event. |
| AU-4 | Audit Storage Capacity | The organization allocates audit record storage capacity and configures auditing to reduce the likelihood of such capacity being exceeded. |

In some embodiments, RADS may be designed such that it is certifiable to process and store United States military SECRET classification. In some embodiments, the RADS log file size may remain within limits appropriate for the CPS device, regardless of the number of events that occur between offloading logs from the CPS device. In some embodiments, the RADS-verifier software may be designed to operate on a typical general-purpose computer. In some embodiments, the RADS software must be designed to operate under the following conditions: (i) the RADS verifier software may be designed to operate on a general-purpose computer, and (ii) the RADS prover software may be designed to operate on typical CPS devices and applications. Such CPS devices may include: (i) compute platforms with no operating system, or a real-time operating system, (ii) compute platforms with limited RAM, flash, and CPU, (iii) platform-specific libraries and/or minimal libraries, and (iv) multiple data file formats (e.g. txt, exe, dll, etc.). For example, on an example CPS device, the compute platform is a DSP with no operating system, 36 kB of RAM, and 256 kB of flash. The libraries are specific to the DSP, and the software is written in C/C++ and uses platform-specific libraries, where the fastest signals update at 20 kHz.

In some embodiments, the RADS may meet the NIST RMF requirement such that the RADS is assessable and authorizable when it is integrated and deployed onto a system environment.

Figure 13A:
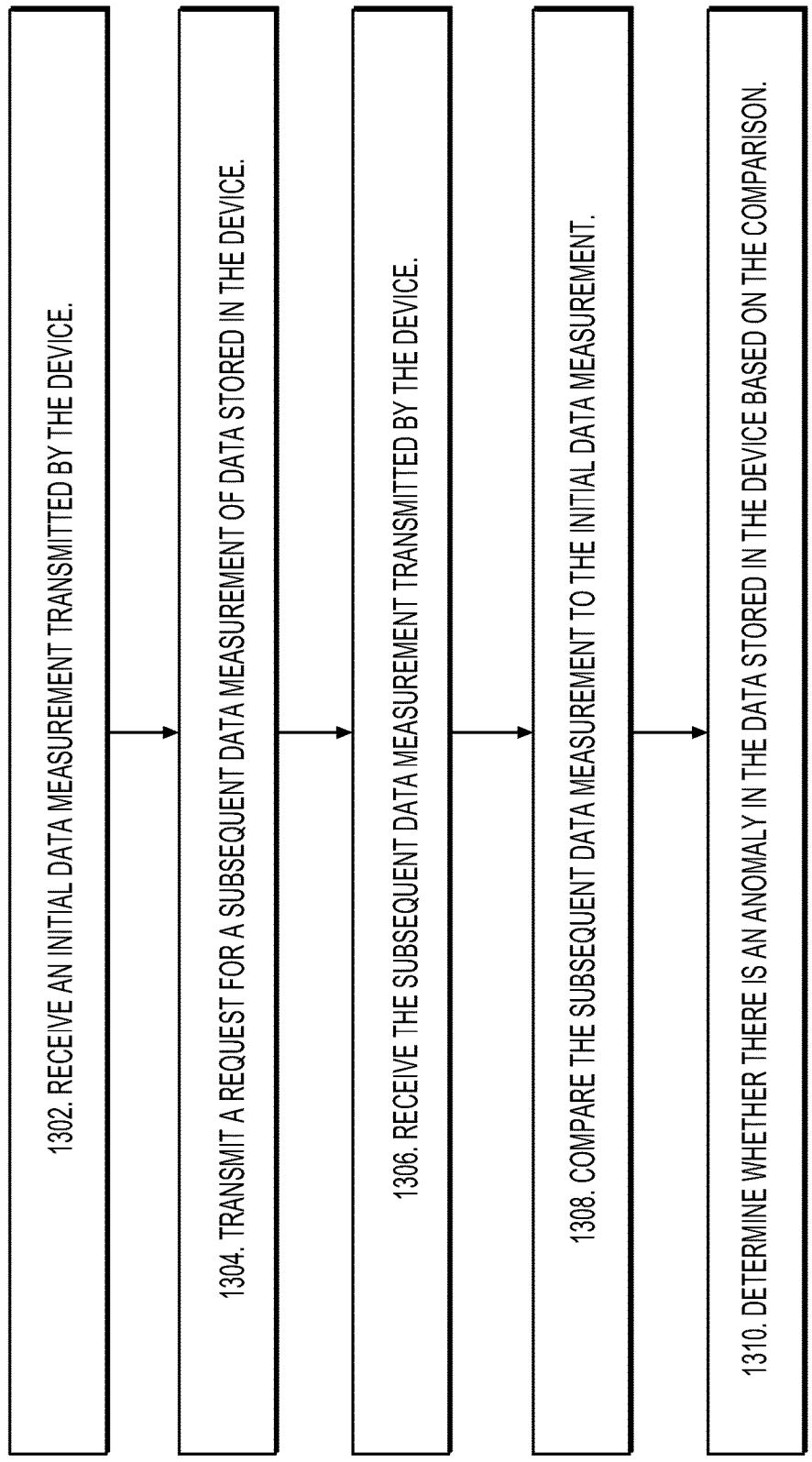

FIG. 13A depicts a flowchart of a method 1300 of detecting data anomalies on a device. In some embodiments, method 1300 may be performed by the RADS verifier 130 and/or the hardware platform hosting the RADS verifier.

Method 1300 may begin with step 1302 in which one or more processors may receive an initial data measurement transmitted by the device (e.g., CPS device). In some embodiments, the initial data measurement may be transmitted by the RADS prover 140 hosted on the device. In some embodiments, the initial data measurement includes a measurement of data stored in the device using a unique key (e.g., root key) associated with the device. In some embodiments, the device may be a remote cyber-physical system device.

In some embodiments, secure communication with the device may be established prior to receiving the initial data measurement. In some embodiments, method 1300 may include a further step of establishing secure communication with the device by exchanging a public key with the device, and obtaining one or more public key and private key pairs from a certificate authority.

In step 1304, the one or more processors may transmit a request for a subsequent data measurement of data stored in the device.

In step 1306, the one or more processors may receive the subsequent data measurement transmitted by the device.

In step 1308, the one or more processors may compare the subsequent data measurement to the initial data measurement.

In step 1310, the one or more processors may determine whether an anomaly exists in the data stored in the device based on the comparison. In some embodiments, step 1310 may include determining a deviation in the subsequent data measurement compared to the initial data measurement, and determining the anomaly in the data stored in the device based on determined deviation. In some embodiments, step 1310 may include determining that the subsequent data measurement matches the initial data measurement; and determining that the anomaly does not exist in the data stored in the device as a result of determining that the subsequent data measurement matches the initial data measurement.

In some embodiments, method 1300 may include a further step in which the received initial data measurement may be stored in a trusted platform module. In some embodiments, method 1300 may include a further step in which a schedule for transmitting the request for the subsequent data measurement of data stored in the device may be determined. In some embodiments, the schedule may include a number of devices to transmit the request and a frequency at which to transmit the request.

FIG. 13B depicts a flowchart of a method 1350 of detecting data anomalies on a device. In some embodiments, method 1350 may be performed by the RADS prover 140 and/or the hardware platform hosting the RADS prover, e.g., CPS device 120.

Method 1350 may begin with step 1352 in which one or more processors may determine a unique key (e.g., root key) associated with the device. In some embodiments, the determined unique key may be stored in a trusted platform module of the device. In some embodiments, the device may be a remote cyber-physical system device.

In step 1354, the one or more processors may determine an initial measurement of data stored in the device using the unique key.

In step 1356, the one or more processors may transmit the initial measurement of data stored in the device. In some embodiments, the initial measurement of data stored in the device may be transmitted to a server (e.g., hardware platform hosting the RADS verifier 130). In some embodiments, secure communication with the server may be established prior to transmitting the initial data measurement.

In step 1358, the one or more processors may receive a request for a subsequent measurement of data stored in the device.

In step 1360, the one or more processors may determine a subsequent measurement of data stored in the device using the unique key.

In step 1362, the one or more processors may transmit the subsequent measurement of data stored in the device.

Figure 14:
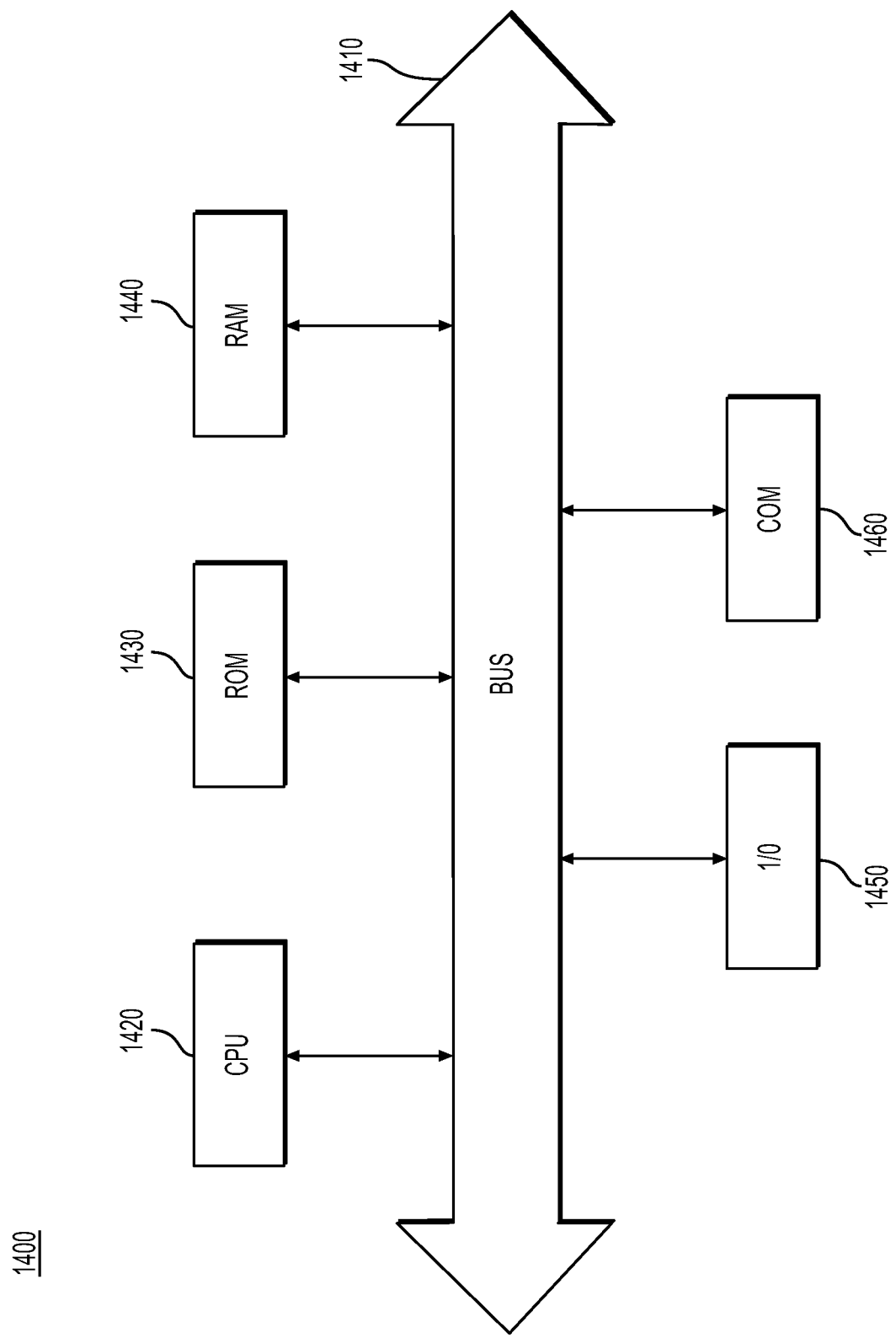
FIG. 14 depicts an exemplary computer device or system, in which embodiments of the present disclosure, or portions thereof, may be implemented.

FIG. 14 depicts an exemplary computer device or system, in which embodiments of the present disclosure, or portions thereof, may be implemented. Each of the computing system(s), databases, user interfaces, and methods described above with respect to FIGS. 1-13B can be implemented via device 1400 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-13B.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-13B, may be implemented using device 1400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 14, device 1400 may include a central processing unit (CPU) 1420. CPU 1420 may be any type of processor device including, for example, any type of special purpose or a general-purpose microprocessor device. As will be appreciated by persons skilled in the relevant art, CPU 1420 also may be a single processor in a multi-core/multi-processor system, such system operating alone, or in a cluster of computing devices operating in a cluster or server farm. CPU 1420 may be connected to a data communication infrastructure 1410, for example, a bus, message queue, network, or multi-core message-passing scheme.

Device 1400 also may include a main memory 1440, for example, random access memory (RAM), and also may include a secondary memory 1430. Secondary memory 1430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1430 may include other similar means for allowing computer programs or other instructions to be loaded into device 1400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1400.

Device 1400 also may include a communications interface ("COM") 1460. Communications interface 1460 allows software and data to be transferred between device 1400 and external devices. Communications interface 1460 may include a modem, a network interface (such as an Ethernet card), a communications port, a PCMCIA slot and card, or the like. Software and data transferred via communications interface 1460 may be in the form of signals, which may be electronic, electromagnetic, optical, or other signals capable of being received by communications interface 1460. These signals may be provided to communications interface 1460 via a communications path of device 1400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1400 also may include input and output ports 1450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for detecting data anomalies on a device, comprising:
   receiving, by one or more processors, an initial data measurement transmitted by the device, wherein the initial data measurement includes a measurement of data stored in the device using a unique key associated with the device;

transmitting, by the one or more processors, a request for a subsequent data measurement of data stored in the device based on a schedule, wherein the schedule identifies a plurality of devices to transmit the request and a frequency at which to transmit the request;

receiving, by the one or more processors, the subsequent data measurement transmitted by the device;

comparing, by the one or more processors, the subsequent data measurement to the initial data measurement; and determining, by the one or more processors, whether an anomaly exists in the data stored in the device based on the comparison.

2. The computer-implemented method of claim 1, further comprising:

storing the received initial data measurement in a trusted platform module.

3. The computer-implemented method of claim 1, wherein determining whether an anomaly exists in the data stored in the device based on the comparison further comprises:

determining a deviation in the subsequent data measurement compared to the initial data measurement; and determining the anomaly in the data stored in the device based on determined deviation.

4. The computer-implemented method of claim 1, wherein determining whether an anomaly exists in the data stored in the device based on the comparison further comprises:

determining that the subsequent data measurement matches the initial data measurement; and determining that the anomaly does not exist in the data stored in the device as a result of determining that the subsequent data measurement matches the initial data measurement.

5. The computer-implemented method of claim 1, wherein the device is a remote cyber-physical system (CPS) device.

6. The computer-implemented method of claim 1, further comprising:

establishing secure communication with the device prior to receiving the initial data measurement.

7. The computer-implemented method of claim 6, further comprising:

establishing secure communication with the device by exchanging a public key with the device, and obtaining one or more public key and private key pairs from a certificate authority.

8. A computer-implemented method for detecting data anomalies on a device, comprising:

determining, by one or more processors, a unique key associated with the device;

determining, by the one or more processors, an initial measurement of data stored in the device using the unique key;

transmitting, by the one or more processors, the initial measurement of data stored in the device;

receiving, by the one or more processors, a request for a subsequent data measurement of data stored in the device based on a schedule, wherein the schedule identifies a plurality of devices to transmit the request and a frequency at which to transmit the request;

determining, by the one or more processors, a subsequent measurement of data stored in the device using the unique key; and transmitting, by the one or more processor, the subsequent measurement of data stored in the device.

9. The computer-implemented method of claim 8, further comprising:

storing the determined unique key in a trusted platform module of the device.

10. The computer-implemented method of claim 8, wherein the device is a remote cyber-physical system (CPS) device.

11. The computer-implemented method of claim 8, further comprising:

transmitting, by the one or more processors, the initial measurement of data stored in the device to a server; and establishing secure communication with the server prior to transmitting the initial data measurement.

12. A non-transitory computer-readable medium storing instructions that, when executed by a processor, cause the processor to perform a method for detecting data anomalies on a device, the method comprising:

receiving an initial data measurement transmitted by the device, wherein the initial data measurement includes a measurement of data stored in the device using a unique key associated with the device;

transmitting a request for a subsequent data measurement of data stored in the device based on a schedule, wherein the schedule identifies a plurality of devices to transmit the request and a frequency at which to transmit the request;

receiving the subsequent data measurement transmitted by the device;

comparing the subsequent data measurement to the initial data measurement; and determining whether an anomaly exists in the data stored in the device based on the comparison.

13. The non-transitory computer-readable medium of claim 12, the method further comprising:

storing the received initial data measurement in a trusted platform module.

14. The non-transitory computer-readable medium of claim 12, wherein determining whether an anomaly exists in the data stored in the device based on the comparison further comprises:

determining a deviation in the subsequent data measurement compared to the initial data measurement; and determining the anomaly in the data stored in the device based on determined deviation.

15. The non-transitory computer-readable medium of claim 12, wherein determining whether an anomaly exists in the data stored in the device based on the comparison further comprises:

determining that the subsequent data measurement matches the initial data measurement; and determining that the anomaly does not exist in the data stored in the device as a result of determining that the subsequent data measurement matches the initial data measurement.

16. The non-transitory computer-readable medium of claim 12, wherein the device is a remote cyber-physical system (CPS) device.

17. The non-transitory computer-readable medium of claim 12, the method further comprising:

establishing secure communication with the device prior to receiving the initial data measurement.

18. The non-transitory computer-readable medium of claim 17, the method further comprising:

exchanging a public key with the device, and obtaining one or more public key and private key pairs from a certificate authority.

\* \* \* \* \*